United States Patent
Ishida et al.

(10) Patent No.: US 12,030,332 B2
(45) Date of Patent: Jul. 9, 2024

(54) PRINTING SYSTEM AND PRINTING METHOD

(71) Applicant: SCREEN HOLDINGS CO., LTD., Kyoto (JP)

(72) Inventors: Tetsuya Ishida, Kyoto (JP); Susumu Takahashi, Kyoto (JP); Seiya Nomura, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 331 days.

(21) Appl. No.: 17/677,140

(22) Filed: Feb. 22, 2022

(65) Prior Publication Data
US 2022/0297462 A1 Sep. 22, 2022

(30) Foreign Application Priority Data
Mar. 22, 2021 (JP) ................................ 2021-046821

(51) Int. Cl.
| | |
|---|---|
| B42C 19/08 | (2006.01) |
| B41J 11/42 | (2006.01) |
| B42C 1/12 | (2006.01) |
| G06K 15/00 | (2006.01) |
| G06K 15/02 | (2006.01) |
| G06K 15/16 | (2006.01) |
| B42C 19/02 | (2006.01) |

(52) U.S. Cl.
CPC .............. *B42C 19/08* (2013.01); *B41J 11/42* (2013.01); *B42C 1/12* (2013.01); *G06K 15/022* (2013.01); *G06K 15/16* (2013.01); *G06K 15/404* (2013.01); *G06K 15/4065* (2013.01); *B42C 19/02* (2013.01)

(58) Field of Classification Search
CPC . B42C 19/08; B42C 1/12; B42C 19/02; B41J 11/42; G06K 15/022; G06K 15/16; G06K 15/404; G06K 15/4065
See application file for complete search history.

(56) References Cited

U.S. PATENT DOCUMENTS

| | | | | |
|---|---|---|---|---|
| 5,172,179 A | * | 12/1992 | Tani | B42C 1/125 |
| | | | | 270/58.08 |
| 5,980,676 A | * | 11/1999 | Meetze | B65H 83/02 |
| | | | | 156/247 |
| 2008/0038092 A1 | * | 2/2008 | Nakamichi | B42C 9/0037 |
| | | | | 412/14 |

FOREIGN PATENT DOCUMENTS

| | | | | |
|---|---|---|---|---|
| JP | H07122760 B2 | * | 6/1985 | ............. G03G 15/00 |
| JP | 2010-072313 A | | 4/2010 | |
| JP | 2015-174331 A | | 10/2015 | |

* cited by examiner

*Primary Examiner* — Yaovi M Ameh
(74) *Attorney, Agent, or Firm* — Rimon P.C.

(57) ABSTRACT

A printing system, including a printing apparatus that sends a print paper after printing to a post-processing machine and a web buffer that temporarily holds a print paper after printing, is provided with: a required print time calculation unit that calculates a required print time for each job; an increase and decrease amount calculation unit that calculates an increase and decrease amount of a consumption amount of the buffer per set for each job on the basis of a difference between a minimum processing time required for a process in a post-processing machine and the required print time; a predicted value calculation unit that obtains a predicted value of the consumption amount of the web buffer by accumulating increase and decrease amounts; and a conveyance control unit that controls a conveyance speed of print paper on the basis of the predicted value.

14 Claims, 16 Drawing Sheets

Fig.9

| JOB NAME | PRINT LENGTH PER SET (unit:m) | PRINT TIME PER SET AT PRINT SPEED OF 120 mpm (unit:sec) | PRINT TIME PER SET AT PRINT SPEED OF 90 mpm (unit:sec) | INCREASE AND DECREASE AMOUNT OF CONSUMPTION AMOUNT OF WEB BUFFER PER SET AT PRINT SPEED OF 120 mpm (unit:m) | INCREASE AND DECREASE AMOUNT OF CONSUMPTION AMOUNT OF WEB BUFFER PER SET AT PRINT SPEED OF 90 mpm (unit:m) | NUMBER OF SETS |
|---|---|---|---|---|---|---|
| Ja | 6 | 3 | 4 | 0 | −1.5 | 100 |
| Jb | 4 | 2 | 2.7 | 2 | 0.45 | 10 |
| Jc | 2 | 1 | 1.3 | 4 | 2.55 | 1 |
| Jd | 10 | 5 | 6.7 | −4 | −5.55 | 20 |

Fig. 17

| JOB NAME | PRINT LENGTH PER SET (unit:m) | PRINT TIME PER SET AT PRINT SPEED OF 120 mpm (unit:sec) | PRINT TIME PER SET AT PRINT SPEED OF 90 mpm (unit:sec) | INCREASE AND DECREASE AMOUNT OF CONSUMPTION AMOUNT OF WEB BUFFER PER SET AT PRINT SPEED OF 120 mpm (unit:m) | INCREASE AND DECREASE AMOUNT OF CONSUMPTION AMOUNT OF WEB BUFFER PER SET AT PRINT SPEED OF 90 mpm (unit:m) | NUMBER OF SETS |
|---|---|---|---|---|---|---|
| Ja | 4 | 2 | 2.7 | 2 | 0.45 | 1 |
| Jb | 6 | 3 | 4 | 0 | −1.5 | 5 |
| Jc | 1 | 0.5 | 0.67 | 5 | 3.5 | 4 |
| Jd | 5 | 2.5 | 3.35 | 1 | −0.5 | 2 |
| Je | 10 | 5 | 6.7 | −4 | −5.55 | 10 |

PRINTING SYSTEM AND PRINTING METHOD

BACKGROUND OF THE INVENTION

Field of the Invention

The present invention relates to a printing system and a printing method, and more particularly to a printing system configured to be able to consistently perform steps from printing to bookbinding, and a printing method in the printing system.

Description of Related Art

Conventionally, as an apparatus for performing printing and binding of a book or the like, a printing apparatus that performs printing on a base material (print medium) and a post-processing machine that performs a process called "post-processing" on a printed base material are known. As the printing apparatus, a digital printing apparatus (e.g., inkjet printer) has been increasingly employed in recent years. In a digital printing apparatus used for bookbinding, long belt-shaped print paper (continuous paper) called rolled paper is typically employed as a base material. As the post-processing machine, the following are used: a sheet cutter (cutting machine) that cuts continuous paper after printing by a printing apparatus into a specified size, a folding machine that creates a signature from print paper cut into a specified size, a gathering machine that gathers a plurality of signatures, a binding machine that performs binding processing on a group of signatures in a collated state, a three-way cutting machine that performs finish cutting in three directions (head, tail, fore edge) of a book, and the like. Note that the post-processing machine to be used differs depending on the type of a final product.

In recent years, high-mix small-lot production has been increasingly performed for printing and bookbinding. When high-mix small-lot production is performed, the frequency at which human work is required is higher than when small-variety mass production is performed. When human work is required, the cost increases, and the probability of occurrence of defective products and the like due to work errors also increases. Therefore, in recent years, an in-line process for steps from printing to bookbinding has been advanced. According to the in-line system, the process from printing to bookbinding can be performed in a consistent and automatic manner. Thus, even when high-mix small-lot production is performed, it is possible to prevent the occurrence of defective products and the like due to work errors. It is also possible to shorten the delivery time and reduce the cost as compared with the related art.

Here, the terms "print speed" and "conveyance speed" used in the present specification will be described. The print speed represents a printing distance (distance of a portion where printing is performed on the print paper) per unit time in the conveyance direction of the print paper. The conveyance speed is a term used at the time of focusing on the control of the conveyance of the print paper and represents the moving distance of the print paper per unit time in the conveyance direction of the print paper (distance at which a conveyance mechanism conveys the print paper per unit time). When printing is normally performed, the print speed and the conveyance speed are equal. In a printing apparatus described in the present specification, a plurality of print speeds are prepared as settable speeds, and an ink ejection amount and the conveyance speed are controlled in accordance with the selected print speed.

Note that the following related art documents are known in connection with the present invention. JP 2010-72313 A discloses a technique that prevents bookbinding failure and stoppage of equipment, regarding a bookbinding apparatus system including an image forming apparatus, a folding apparatus, and a bookbinding apparatus. JP 2015-174331 A discloses a technique that reduces the occurrence of problems caused by the type of post-processing, regarding an image forming system including an image forming apparatus and a post-processing apparatus.

Regarding steps of performing post-processing for bookbinding by using printed continuous paper as a base, there is a time restriction on a switching mechanism for shifting from a process of a certain set (one book) to a process for the next set (one book). Typically, a time constraint is increased in an apparatus (referred to as a "book-block making machine" for convenience) for making a book block by collecting pieces of cut print paper for each one set among a plurality of post-processing machines provided on the downstream side of a printing apparatus. In a case where the configuration in which the printing apparatus and the post-processing machine are directly connected (in-line configuration) has been employed, print paper is fed to the post-processing machine in accordance with the print speed (conveyance speed). Therefore, for example, when the printed print paper for a book with a small number of pages is fed to the post-processing machine, the process in the post-processing machine may not be in time for the feeding speed of the print paper. Therefore, in order to absorb the difference in process speed between the printing apparatus and the post-processing machine, as shown in FIG. 20, a web buffer 91 for temporarily holding printed print paper is provided between a printing apparatus 90 and a post-processing machine group 92 including a book-block making machine 93.

In the configuration in which the web buffer 91 is provided, when the consumption amount of the web buffer 91 becomes equal to or greater than a predetermined threshold (in other words, when the free space of the web buffer 91 becomes equal to or less than a predetermined threshold), an instruction to request deceleration or stop is sent from the web buffer 91 to the printing apparatus 90. In response to such an instruction, the printing apparatus 90 needs to change the print speed (conveyance speed).

FIG. 21 is a diagram for explaining a conventional operation example. Part A of FIG. 21 shows a change in the free space of the web buffer 91, and Part B of FIG. 21 shows a change in the conveyance speed. For Part A, B91 represents the maximum capacity of the web buffer 91, B92 represents a free space in a steady state, B93 represents a free space at which a request for deceleration is made to the printing apparatus 90, and B94 represents a free space at which a request for stop is made to the printing apparatus 90. For Part B, V91 represents a conveyance speed during normal operation, V92 represents a conveyance speed during deceleration operation, and V93 represents a conveyance speed when printing is stopped.

After the operation of the printing apparatus 90 is started at time t90, the conveyance speed gradually increases. At time t91, the conveyance speed becomes V91, and the free space of the web buffer 91 becomes B92. At time t92, the free space of the web buffer 91 starts to decrease. When the free space of the web buffer 91 becomes B93 at time t93, an instruction to request deceleration is sent from the web buffer 91 to the printing apparatus 90. Thereby, the conveyance speed starts to decrease at time t93, and the conveyance speed becomes V92 at time t94. Thereafter, when the free space of the web buffer 91 becomes B94 at time t95, an instruction to request stop is sent from the web buffer 91 to the printing apparatus 90. Thereby, the conveyance speed further starts to decrease at time t95. As a result of this decrease in the conveyance speed, the free space of the web buffer 91 starts to increase at time t96. Then, at time t97, the free space of the web buffer 91 becomes B92, and an instruction to request acceleration is sent from the web buffer 91 to the printing apparatus 90. Thereby, the conveyance speed gradually increases from time t97.

In the example shown in FIG. 21, the conveyance speed greatly varies during the operation of the printing apparatus 90. In this regard, it is not necessarily easy for the printing apparatus 90 to change the conveyance speed to the instructed speed within the instructed time. Furthermore, a large variation in the conveyance speed, that is, a large variation in the print speed causes a change in the amount of ink ejected from a head, drying unevenness caused by the inability of a drying heater to keep up with a change in the conveyance speed, landing deviation of ink droplets, resonance of a servo motor for controlling the conveyance speed, and the like. This results in a decrease in print quality. In particular, when a large number of jobs of a book with a small number of pages are included in a process target at the time of execution of one continuous printing, the print speed (conveyance speed) changes frequently, and thus, the print quality remarkably decreases, and the productivity decreases.

Note that JP 2010-72313 A and JP 2015-174331 A do not describe anything about reducing the difference in process speed between the printing apparatus and the post-processing machine or about the web buffer.

SUMMARY OF THE INVENTION

In view of the above circumstances, an object of the present invention is to achieve a printing system capable of preventing a decrease in print quality and a decrease in productivity due to control of a conveyance speed (a speed at which a print medium is conveyed) for reducing the difference in process speed between a printing apparatus and a post-processing machine.

One aspect of the present invention is directed to a printing system including a printing apparatus configured to send a print medium after printing to a post-processing machine group including one or more post-processing machines, the printing apparatus being capable of performing continuous printing based on a plurality of jobs, the printing system including:
  a conveyance mechanism configured to convey the print medium and provided inside the printing apparatus;
  a print medium buffer for temporarily holding a print medium after printing when printing based on a job for which a required print time is shorter than a minimum processing time is performed, the print medium buffer being provided between the printing apparatus and the post-processing machine group, the required print time being a time per set required for printing by the printing apparatus, the minimum processing time being a least required time from a start time of a process for one set to a start time of a process for a next one set in the post-processing machine group;
  a required print time calculation unit configured to calculate the required print time for each of the jobs;
  an increase and decrease amount calculation unit configured to calculate, for each of the jobs, an increase and decrease amount of a consumption amount of the print medium buffer per set on a basis of a difference between the minimum processing time and the required print time;
  a predicted value calculation unit configured to obtain a predicted value of the consumption amount of the print medium buffer by accumulating increase and decrease amounts calculated by the increase and decrease amount calculation unit; and
  a conveyance control unit configured to control a conveyance speed at which the conveyance mechanism conveys the print medium on a basis of the predicted value.

With such a configuration, for each job, the increase and decrease amount of the consumption amount of the print medium buffer per set is calculated on the basis of the difference between the required print time, which is the time per set required to perform printing, and the minimum processing time, which is the least required time for a process for one set in the post-processing machine. Then, a predicted value of the consumption amount of the print medium buffer is obtained by accumulating the increase and decrease amounts, and the conveyance speed of the print medium is controlled on the basis of the predicted value. From the above, the printing apparatus can voluntarily control the conveyance speed in consideration of a change in the consumption amount of the print medium buffer, without a request (a request for deceleration or stop) from the post-processing machine or the print medium buffer. It is thereby possible to make the variation in the conveyance speed smaller than in the past. Further, by controlling the conveyance speed on the basis of the predicted value, the conveyance speed can be reduced at a timing earlier than in the past, and as a result, the possibility of stopping printing is reduced. From the above, a decrease in print quality and a decrease in productivity are prevented. Moreover, since the conveyance speed can be controlled so that the consumption amount of the print medium buffer is as small as possible, it is possible to employ a print medium buffer having a smaller maximum capacity than in the past. Thereby, an effect of cost reduction can be obtained. As described above, a printing system capable of preventing a decrease in print quality and a decrease in productivity due to control of a conveyance speed of a print medium for reducing the difference in process speed between the printing apparatus and the post-processing machine.

Another aspect of the present invention is directed to a printing method in a printing system including a printing apparatus configured to send a print medium after printing to a post-processing machine group including one or more post-processing machines, the printing being capable of performing continuous printing based on a plurality of jobs, the printing system including
  a conveyance mechanism configured to convey the print medium and provided inside the printing apparatus, and
  a print medium buffer for temporarily holding a print medium after printing when printing based on a job for which a required print time is shorter than a minimum processing time is performed, the print medium buffer being provided between the printing apparatus and the post-processing machine group, the required print time being a time per set required for printing by the printing apparatus, the minimum processing time being a least required time from a start time of a process for one set to a start time of a process for a next one set in the post-processing machine group, the printing method including:

a required print time calculation step of calculating the required print time for each of the jobs;

an increase and decrease amount calculation step of calculating, for each of the jobs, an increase and decrease amount of a consumption amount of the print medium buffer per set on a basis of a difference between the minimum processing time and the required print time;

a predicted value calculation step of obtaining a predicted value of the consumption amount of the print medium buffer by accumulating increase and decrease amounts calculated by the increase and decrease amount calculation step; and a conveyance control step of controlling a conveyance speed at which the conveyance mechanism conveys the print medium on a basis of the predicted value.

These and other objects, features, modes, and advantageous effects of the present invention will become more apparent from the following detailed description of the present invention with reference to the accompanying drawings.

BRIEF DESCRIPTION OF THE DRAWINGS

FIG. 9 is a diagram showing information of job used to describe a specific example of the first control example in the embodiment.

FIG. 17 is a diagram showing information of job used to describe a specific example of the second control example in the embodiment.

DETAILED DESCRIPTION OF PREFERRED EMBODIMENT

An embodiment of the present invention will be described below with reference to the accompanying drawings.

1. OVERALL CONFIGURATION

Figure 1:
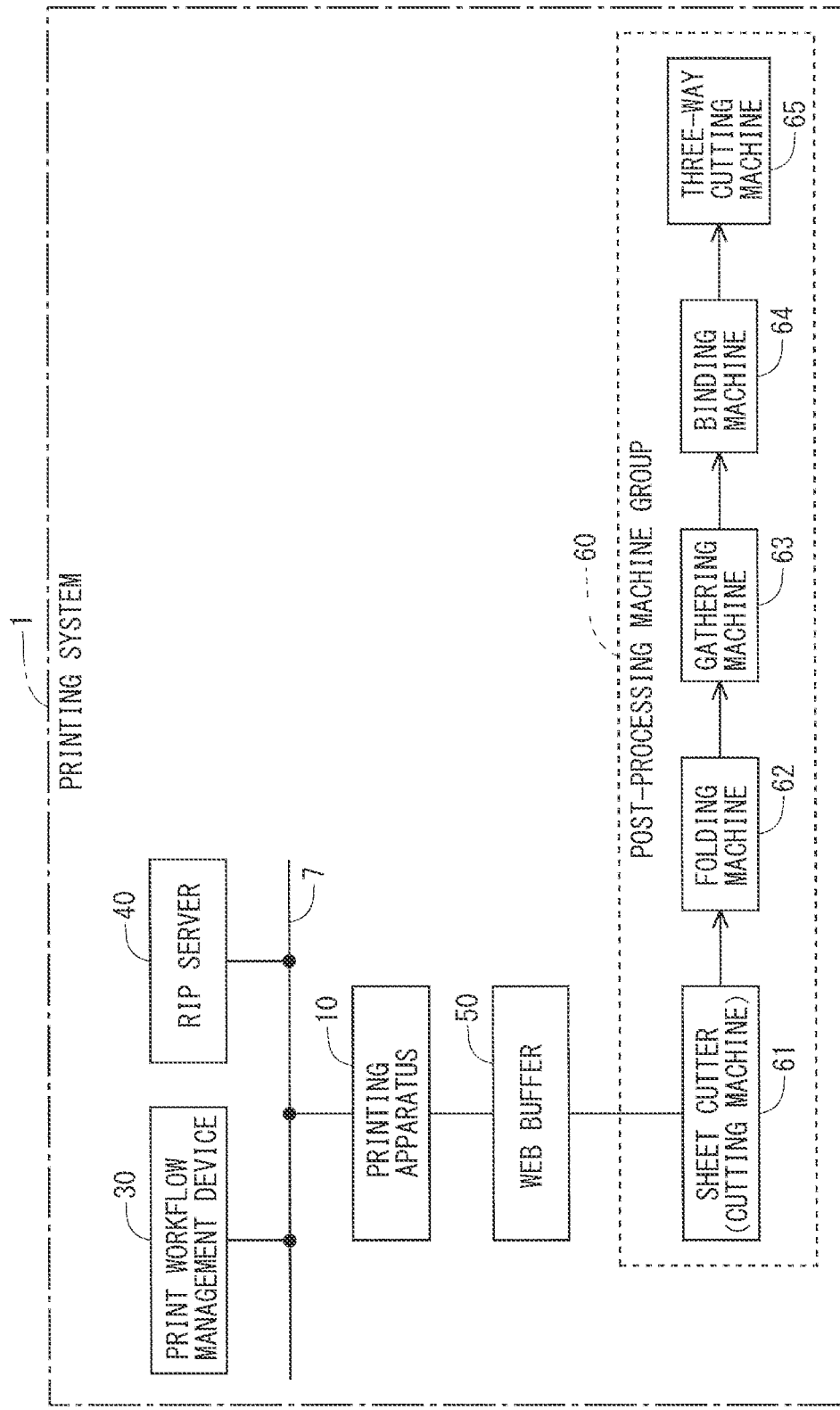
FIG. 1 is an overall configuration diagram of a printing system according to an embodiment of the present invention.

FIG. 1 is a block diagram showing an overall configuration of a printing system 1 according to the present embodiment. The printing system 1 includes a printing apparatus 10, a print workflow management device 30, a raster image processor (RIP) server 40, a web buffer 50, and a post-processing machine group 60. The post-processing machine group 60 includes a plurality of devices for performing post-processing on print paper (print medium) after printing.

The printing apparatus 10 schematically includes a printer body and a print control apparatus that is a controller of the printer body. The printing apparatus 10 according to the present embodiment is an inkjet printer and performs printing (continuous feed printing) on roll paper that is continuous paper.

The print workflow management device 30 manages a series of processes for performing printing in the printing system 1. That is, the print workflow management device 30 performs print workflow management. In this regard, a computer, such as a personal computer in which application software for managing a print workflow (print workflow management system) is installed, functions as the print workflow management device 30. The print workflow management device 30 holds a plurality of flatplan templates each defining how to arrange each page constituting submitted data on a sheet as a template. Each job is associated with one of the plurality of flatplan templates.

The RIP server 40 performs a RIP process (rasterization process) on data in a vector format generated by performing an imposition process using submitted data.

As shown in FIG. 1, the web buffer 50 is provided between the printing apparatus 10 and the post-processing machine group 60. The continuous paper after printing by the printing apparatus 10 is supplied to a sheet cutter 61 included in the post-processing machine group 60 via the web buffer 50. The web buffer 50 temporarily holds the print paper after printing as appropriate in order to absorb the difference in process speed between the printing apparatus 10 and the post-processing machine group 60. More specifically, the web buffer 50 temporarily holds the print paper after printing, when printing based on a job for which a required print time is shorter than a minimum processing time is performed. Regarding this, the required print time is a time per set (one copy) required for printing by the printing apparatus 10, and the minimum processing time is the least required time from a start time of a process for one set (one copy) to a start time of a process for the next one set (one copy) in the post-processing machine group 60. In the present embodiment, a print medium buffer is achieved by the web buffer 50.

The post-processing machine group 60 includes the sheet cutter (cutting machine) 61, a folding machine 62, a gathering machine 63, a binding machine 64, and a three-way cutting machine 65. The sheet cutter 61 cuts the continuous paper after printing by the printing apparatus 10 to a specified size. The folding machine 62 creates a signature from the print paper cut to the specified size. The gathering machine 63 collects a plurality of signatures. The binding machine 64 performs binding processing on the signature group in the collated state. The three-way cutting machine 65 performs finish cutting in three directions (head, tail, fore edge) of the book. Note that the configuration of the post-processing machine group 60 illustrated here is an example and is not limited thereto. Meanwhile, the gathering machine 63 functions as a book-block making machine that makes a book block by collecting pieces of print paper after cutting by the sheet cutter (cutting machine) 61 for each one set. Therefore, hereinafter, the process performed by the gathering machine 63 is referred to as a "book-block making process".

The printing apparatus 10, the print workflow management device 30, and the RIP server 40 are communicably connected by a network 7 such as a local area network (LAN). Submitted data, which is data to be printed, is transmitted from a client computer (not shown) or the like via the network 7.

2. CONFIGURATION OF PRINTING APPARATUS

Figure 2:
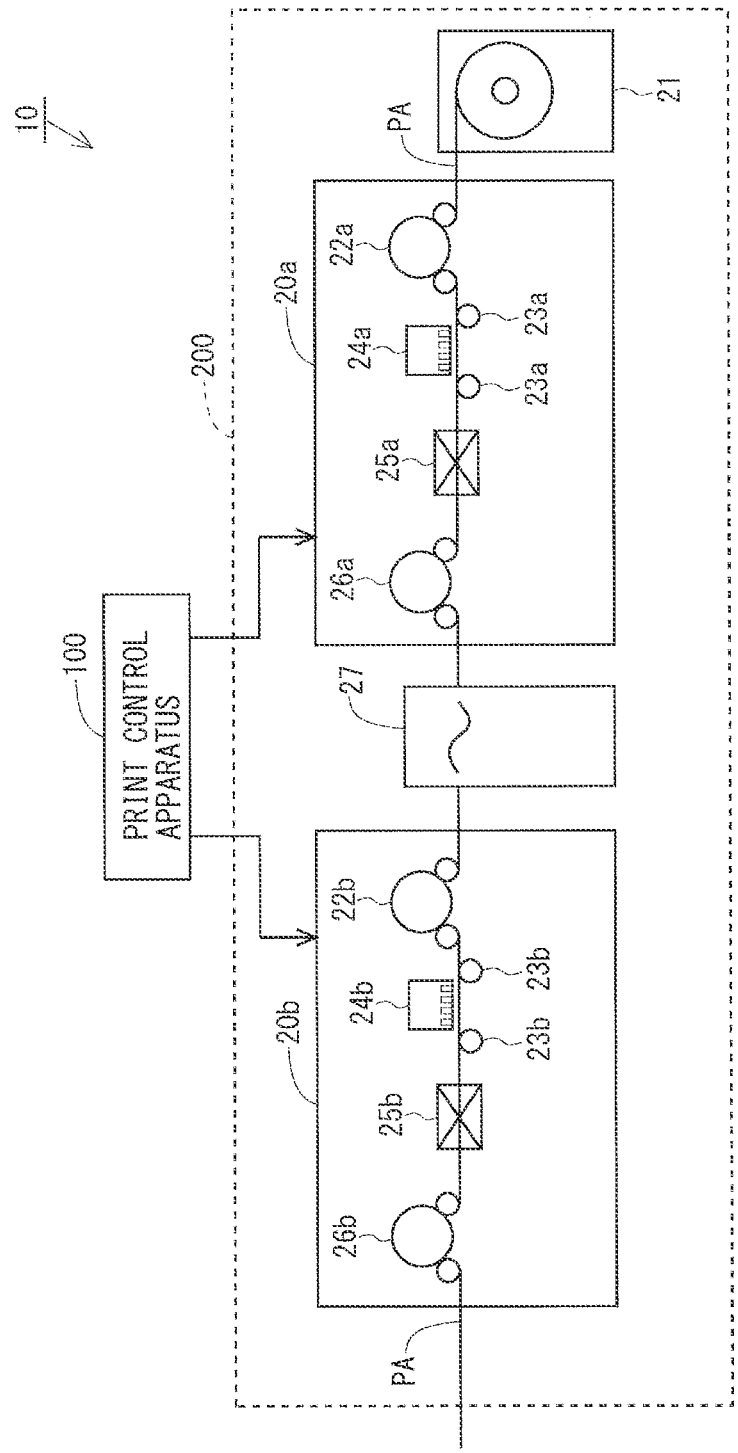
FIG. 2 is a schematic diagram showing a configuration example of a printing apparatus in the embodiment.

FIG. 2 is a schematic diagram showing a configuration example of the printing apparatus 10. As described above, the printing apparatus 10 includes a printer body 200 and a print control apparatus 100 that is a controller of the printer body 200.

The printer body 200 is provided with a paper feeding unit 21 that supplies print paper (here, roll paper) PA, a first printing mechanism 20a that performs printing on the front surface of the print paper PA, a reversing unit 27 that reverses the front surface and the back surface of the print paper PA having been outputted from the first printing mechanism 20a, and a second printing mechanism 20b that performs printing on the back surface of the print paper PA. The first printing mechanism 20a is provided with a first driving roller 22a that conveys the print paper PA to the inside, a plurality of support rollers 23a that conveys the print paper PA inside the first printing mechanism 20a, a printing unit 24a that performs printing by ejecting ink onto the print paper PA, a drying unit 25a that dries the print paper PA after printing, and a second driving roller 26a that outputs the print paper PA from the inside of the first printing mechanism 20a. The printing unit 24a includes, for example, four inkjet head rows that respectively discharge inks of C color (cyan color), M color (magenta color), Y color (yellow color), and K color (black color). The configuration of the second printing mechanism 20b is similar to the configuration of the first printing mechanism 20a, and hence the description thereof will be omitted. Note that "a" is added to the end of each of the reference numerals for the components of the first printing mechanism 20a, and "b" is added to the end of each of the reference numerals for the components of the second printing mechanism 20b.

The print control apparatus 100 controls the operation of the printer body 200 having the configuration as above.

When a printout instruction command is given to the print control apparatus 100, the print control apparatus 100 controls the operation of the printer body 200 so that the print paper PA is conveyed from the paper feeding unit 21 to the inside. Then, respectively in the first printing mechanism 20a and the second printing mechanism 20b, first, printing is performed on the print paper PA by the printing units 24a, 24b, and then, the print paper PA is dried by the drying units 25a, 25b.

Figure 3:
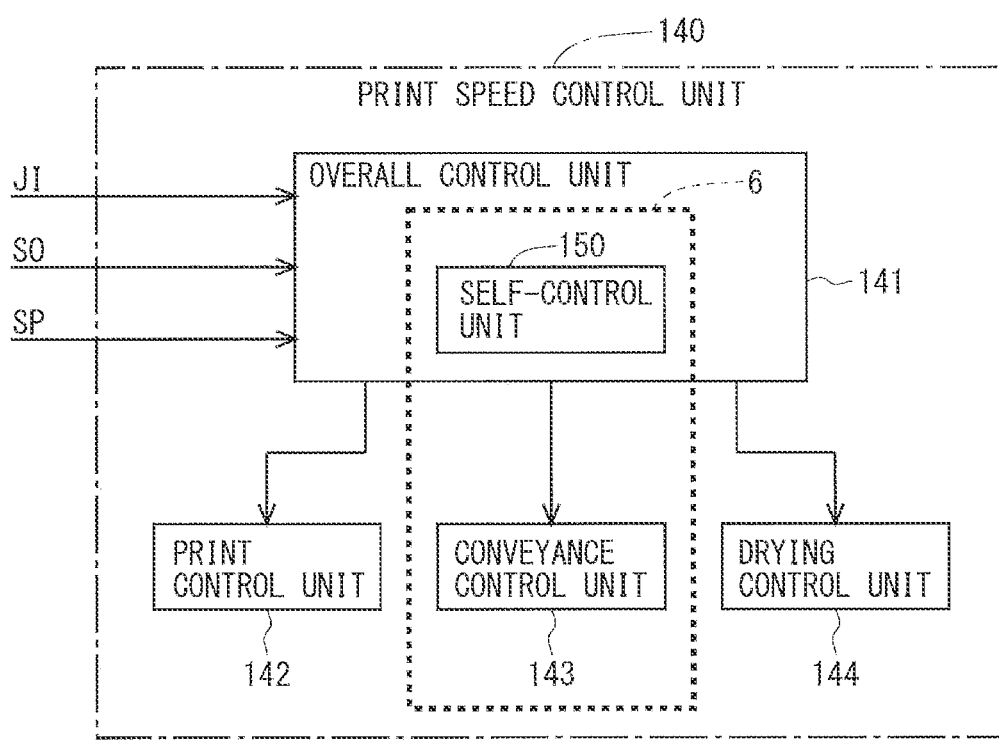
FIG. 3 is a block diagram showing a schematic functional configuration of a print speed control unit in the embodiment.

In the printing apparatus 10 according to the present embodiment, two print speeds (first speed and second speed) are prepared as settable print speeds. The first speed is a speed during normal operation. The second speed is a speed lower than the first speed. With the two print speeds being prepared as described above, the print control apparatus 100 is provided with a print speed control unit 140 for controlling the print speed. FIG. 3 is a block diagram showing a schematic functional configuration of the print speed control unit 140. The print speed control unit 140 includes an overall control unit 141, a print control unit 142, a conveyance control unit 143, and a drying control unit 144. The overall control unit 141 controls the operations of the print control unit 142, the conveyance control unit 143, and the drying control unit 144 in accordance with the set print speed. The print control unit 142 controls the ink ejection timing and ink ejection amount from each of the printing units 24a, 24b in accordance with the print speed. The conveyance control unit 143 controls the speed (conveyance speed) at which a conveyance mechanism conveys the print paper PA. In the present embodiment, the conveyance mechanism is achieved by the paper feeding unit 21, the first driving roller 22a, the support roller 23a, and the second driving roller 26a included in the first printing mechanism 20a, and the first driving roller 22b, the support roller 23b, and the second driving roller 26b included in the second printing mechanism 20b. The conveyance control unit 143 controls the conveyance speed by controlling the rotation speeds of the first driving roller 22a, the second driving roller 26a, the first driving roller 22b, and the second driving roller 26b. The drying control unit 144 controls the temperature (drying temperature) when the drying units 25a, 25b dry the print paper PA in accordance with the print speed.

Conventionally, the print speed is controlled on the basis of information JI of a job to be printed, an instruction SO by an operator, an instruction SP from the web buffer 50 or the post-processing machine group 60, and the like. In the present embodiment, in addition to the above, the print speed is controlled on the basis of the prediction result of the consumption amount of the web buffer 50. Hereinafter, for convenience, such a control is referred to as "self-control of the print speed", and a functional component that achieves the control is referred to as a "self-control unit". As shown in FIG. 3, a self-control unit 150 is included in the overall control unit 141, and the operations of the print control unit 142, the conveyance control unit 143, and the drying control unit 144 are controlled on the basis of the process of the self-control unit 150. However, the following description will be given focusing on a portion indicated by a thick dotted line denoted by reference numeral 6 in FIG. 3.

Although the configuration of the inkjet printer for performing color printing has been exemplified here, the present invention can also be applied to a case where an inkjet printer for performing monochrome printing is employed. Although the configuration of the inkjet printer using the aqueous ink has been exemplified here, the present invention can also be applied to a printing apparatus using ultraviolet (UV) ink (ultraviolet curing ink) such as an inkjet printer for label printing. Moreover, as long as a configuration in which the print medium after printing is sent from the printing apparatus to the post-processing machine via the web buffer has been employed, the present invention can also be applied to a case where a printing apparatus (e.g., laser printer) except for the inkjet printer is used. As above, the type of printing apparatus is not particularly limited.

3. HARDWARE CONFIGURATION OF PRINT CONTROL APPARATUS

Figure 4:
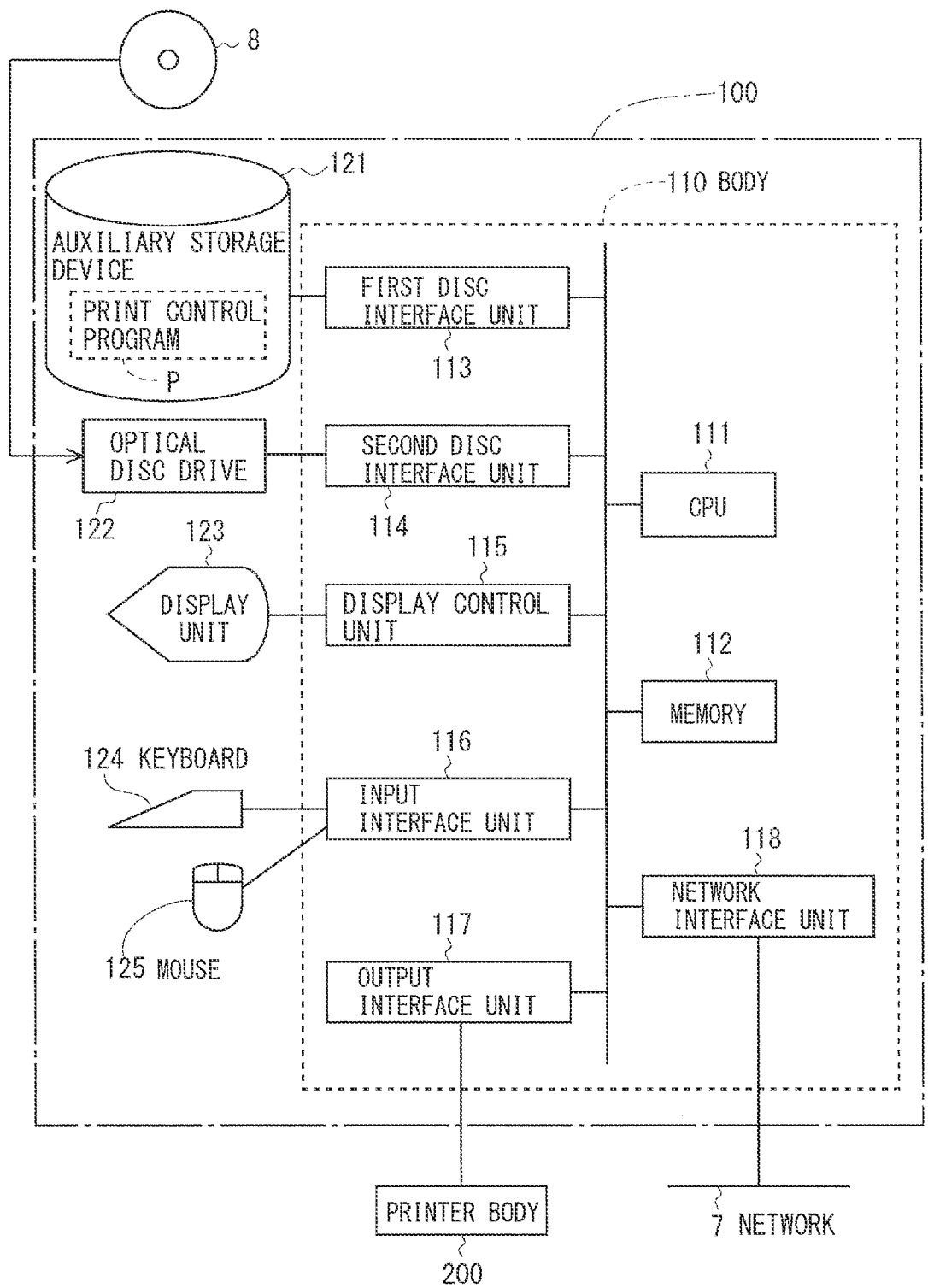
FIG. 4 is a block diagram showing a hardware configuration of a print control apparatus in the embodiment.

FIG. 4 is a block diagram showing a hardware configuration of the print control apparatus 100. As shown in FIG. 4, the print control apparatus 100 is provided with a body 110, an auxiliary storage device 121, an optical disc drive 122, a display unit 123, a keyboard 124, a mouse 125, and the like. The body 110 includes a central processing unit (CPU) 111, a memory 112, a first disc interface unit 113, a second disc interface unit 114, a display control unit 115, an input interface unit 116, an output interface unit 117, and a network interface unit 118. The CPU 111, the memory 112, the first disc interface unit 113, the second disc interface unit 114, the display control unit 115, the input interface unit 116, the output interface unit 117, and the network interface unit 118 are connected to each other via a system bus. The auxiliary storage device 121 is connected to the first disc interface unit 113. The optical disc drive 122 is connected to the second disc interface unit 114. The display unit (display device) 123 is connected to the display control unit 115. The keyboard 124 and the mouse 125 are connected to the input interface unit 116. The printer body 200 is connected to the output interface unit 117 via a communication cable. The network 7 is connected to the network interface unit 118. The auxiliary storage device 121 is a magnetic disk device or the like. An optical disc 8 as a computer-readable recording medium such as a compact disc read-only memory (CD-ROM) or a digital versatile disc (DVD)-ROM is inserted into the optical disc drive 122. The display unit 123 is a liquid crystal display or the like. The display unit 123 is used to display information desired by the operator. The keyboard 124 and the mouse 125 are used by the operator to input instructions to the print control apparatus 100.

The auxiliary storage device 121 stores a print control program (a program for controlling the execution of the printing process by the printer body 200) P. The CPU 111 reads the print control program P stored in the auxiliary storage device 121 into the memory 112 and executes the program to achieve various functions of the print control apparatus 100. The memory 112 includes a random-access memory (RAM) and a read-only memory (ROM). The memory 112 functions as a work area for the CPU 111 to execute the print control program P stored in the auxiliary storage device 121. Note that the print control program P is provided by being stored into the computer-readable recording medium (non-transitory recording medium). That is, for example, a user purchases the optical disc 8 as a recording medium of the print control program P, inserts the optical disc 8 into the optical disc drive 122, reads the print control program P from the optical disc 8, and installs the print control program P in the auxiliary storage device 121. Alternatively, the print control program P transmitted via the network 7 may be received by the network interface unit 118 and installed in the auxiliary storage device 121.

4. FUNCTIONAL CONFIGURATION

Figure 5:
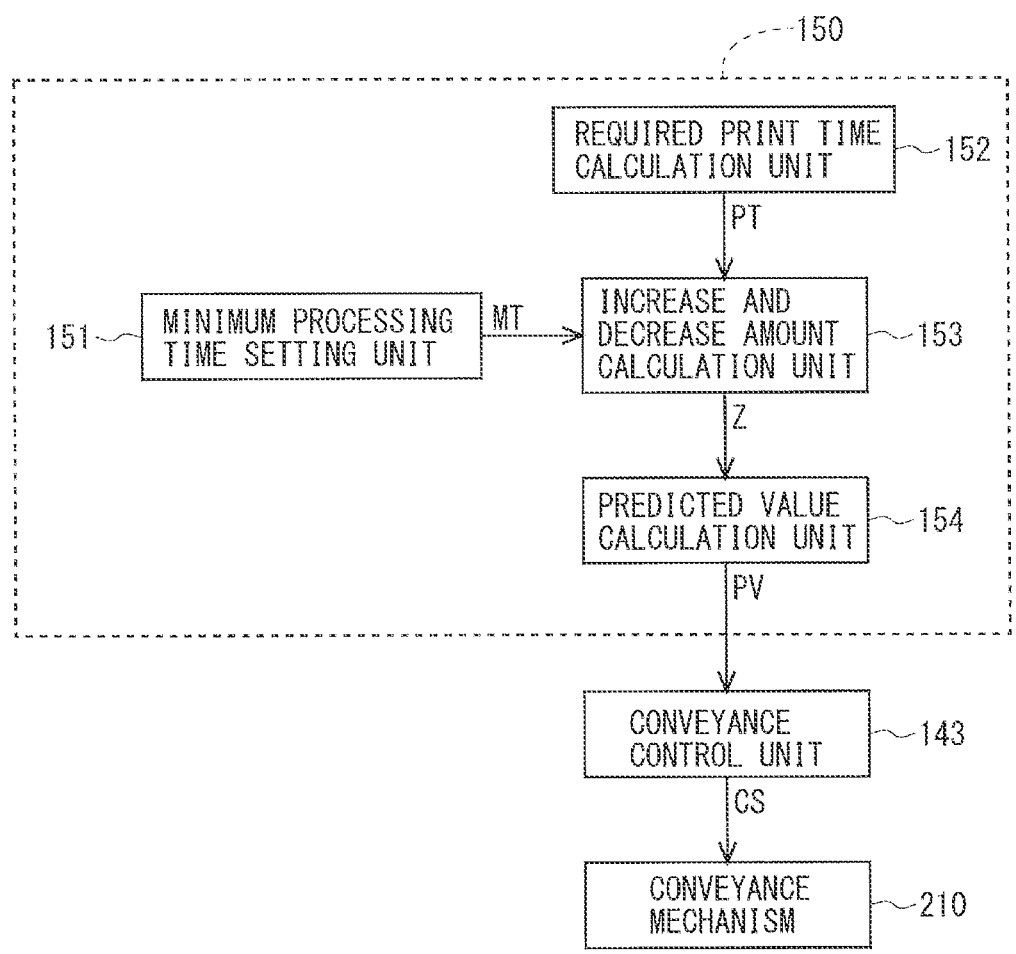
FIG. 5 is a block diagram showing a functional configuration related to self-control of a print speed in the embodiment.

FIG. 5 is a block diagram showing a functional configuration related to self-control of a print speed. As shown in FIG. 5, the self-control unit 150 described above includes a minimum processing time setting unit 151, a required print time calculation unit 152, an increase and decrease amount calculation unit 153, and a predicted value calculation unit 154.

The minimum processing time setting unit 151 sets the minimum processing time MT described above on the basis of, for example, an input of data by the operator. In the present embodiment, since the process of making a book block is performed by the gathering machine 63, a step performed by the gathering machine 63 becomes a temporal bottleneck in the post-processing step. Therefore, in the present embodiment, the least required time from a start time of a process for one set to a start time of a process for the next one set in the gathering machine 63 as the book-block making machine is set as the minimum processing time MT.

The required print time calculation unit 152 calculates the required print time PT for each job. Hereinafter, an example of a specific procedure for calculating the required print time PT will be described. First, information on the number of pages for a job to be processed is acquired. Next, information on the number of pages (hereinafter referred to as "the number of allocated pages") allocated to one sheet and information on the sheet length are extracted from the flatplan template associated with the job to be processed. Then, the print length per set is calculated on the basis of the information on the number of pages, the information on the number of allocated pages, and the information on the sheet length. Thereafter, the required print time PT is obtained on the basis of the print length per set and the print speed. When the number of pages is represented as Np, the number of allocated pages is represented as Na, and the sheet length is represented as Ls, a print length Lp per set is calculated by the following equation (1). Moreover, when the print speed is represented as V, the required print time PT is calculated by the following equation (2).

$$Lp = (Np/Na) \times Ls \tag{1}$$

$$PT = LP/V \tag{2}$$

For each job, the increase and decrease amount calculation unit 153 calculates an increase and decrease amount Z of the consumption amount of the web buffer 50 per set on the basis of the difference between the minimum processing time MT set by the minimum processing time setting unit 151 and the required print time PT calculated by the required print time calculation unit 152. The increase and decrease amount Z of the consumption amount of the web buffer 50 per set is calculated by the following equation (3). Note that a positive value of the increase and decrease amount Z means that the consumption amount of the web buffer 50 increases (the free space of the web buffer 50 decreases), and a negative value of the increase and decrease amount Z means that the consumption amount of the web buffer 50 decreases (the free space of the web buffer 50 increases).

$$Z = (MT - PT) \times V \tag{3}$$

The predicted value calculation unit 154 obtains a predicted value PV of the consumption amount of the web buffer 50 by accumulating the increase and decrease amounts Z calculated by the increase and decrease amount calculation unit 153. Although not particularly limited, the predicted value PV is calculated by the predicted value calculation unit 154, for example, every time the book-block making process for one set in the gathering machine 63 is completed.

The conveyance control unit 143 controls the conveyance speed by giving a control signal CS to a conveyance mechanism 210 on the basis of the predicted value PV obtained by the predicted value calculation unit 154. Specifically, the conveyance control unit 143 gives the control signal CS to the conveyance mechanism 210 including the paper feeding unit 21, the first driving roller 22a, the support roller 23a, the second driving roller 26a, the first driving roller 22b, the support roller 23b, and the second driving roller 26b, whereby the rotation speeds of the first driving roller 22a, the second driving roller 26a, the first driving roller 22b, and the second driving roller 26b are controlled. Accordingly, the conveyance speed is controlled.

Figure 6:
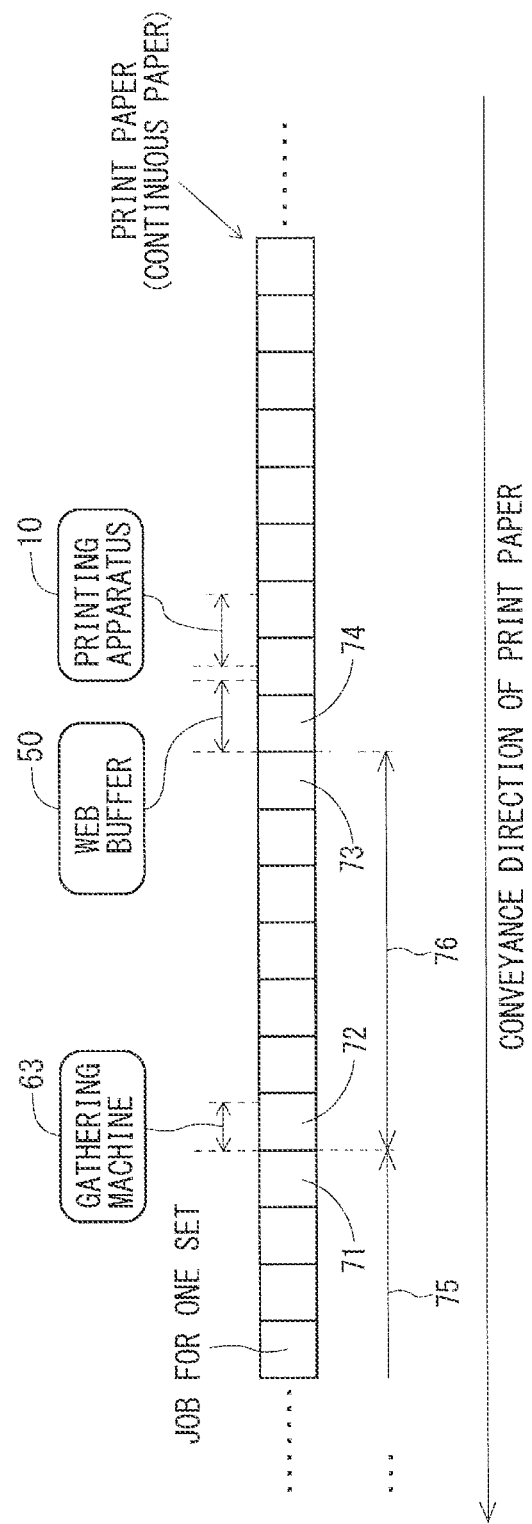
FIG. 6 is a diagram for explaining calculation of a predicted value of a consumption amount of a web buffer in the embodiment.

The calculation of the required print time PT by the required print time calculation unit 152, the calculation of the increase and decrease amount Z by the increase and decrease amount calculation unit 153, and the calculation of the predicted value PV by the predicted value calculation unit 154 will be described in more detail with reference to FIG. 6. FIG. 6 schematically shows a state of continuous printing (a job state) at a certain time point. In FIG. 6, a job for one set is represented by a rectangle that looks like a part of continuous paper (the same applies to FIGS. 7, 10 to 12, 15, 16, 18, and 19.). In this regard, the print length per set actually varies depending on the size of the job, but for convenience, FIG. 6 shows that the print lengths of all the jobs are the same. Further, in FIG. 6, the respective positions of the printing apparatus 10, the web buffer 50, and the gathering machine (book-block making machine) 63 are schematically shown by arrows.

In FIG. 6, a job denoted by reference numeral 71 is a job immediately after the book-block making process is completed. Therefore, the book-block making process has been completed for jobs indicated in an arrow portion denoted by reference numeral 75 (the job denoted by reference numeral 71 and jobs which are earlier in the printing order). A job denoted by reference numeral 72 is a job for which the book-block making process is being performed. The job denoted by reference numeral 73 is a job immediately after the corresponding paper portion is outputted from the web buffer 50. The job denoted by reference numeral 74 is a job immediately before the corresponding paper portion is outputted from the web buffer 50. For convenience of description, hereinafter, a state of a job indicated in the arrow portion denoted by reference numeral 75 is referred to as a "book-block making completed state", and a state of a job indicated in an arrow portion denoted by reference numeral 76 is referred to as a "book-block completion waiting state".

In the present embodiment, the predicted value calculation unit 154 obtains the predicted value PV by accumulating the increase and decrease amounts Z calculated by the increase and decrease amount calculation unit 153 for the jobs corresponding to the print paper having passed through the web buffer 50. That is, the predicted value PV is obtained by accumulating the increase and decrease amounts Z for the jobs in the book-block making completed state and the jobs in the book-block completion waiting state. At this time, for each job in the book-block making completed state, the increase and decrease amount Z is calculated using the required print time PT calculated by the required print time calculation unit 152 on the basis of the conveyance speed (print speed) at the time when the book-block making process is performed, and for each job in the book-block completion waiting state, that is, for each job for which the book-block making process has not been completed, the increase and decrease amount Z is calculated using the required print time PT calculated by the required print time calculation unit 152 on the basis of the current conveyance speed (print speed).

As described above, the predicted value calculation unit 154 obtains the predicted value PV of the consumption amount of the web buffer 50 by accumulating the increase and decrease amounts Z calculated, for the job for which the book-block making process has been completed among the jobs corresponding to the print paper having passed through the web buffer 50, by the increase and decrease amount calculation unit 153 using the required print time PT calculated by the required print time calculation unit 152 on the basis of the conveyance speed when the book-block making process is performed, and the increase and decrease amounts Z calculated, for the job for which the book-block making process has not been completed among the jobs corresponding to the print paper having passed through the web buffer 50, by the increase and decrease amount calculation unit 153 using the required print time PT calculated by the required print time calculation unit 152 on the basis of the current conveyance speed. In order to achieve this, the required print time calculation unit 152 calculates, for each job, the required print time PT based on the conveyance speed when the state is the book-block completion waiting state, that is, the conveyance speed from the passage through the web buffer 50 to the end of the book-block making process, and the required print time PT based on the conveyance speed when the book-block making process is performed. Therefore, for each job, when the conveyance speed from the passage through the web buffer 50 to the end of the book-block making process is constant, the required print time PT is calculated on the basis of one conveyance speed, and when the conveyance speed changes during the period from the passage through the web buffer 50 to the end of the book-block making process, the required print time PT is calculated for each conveyance speed.

Figure 7:
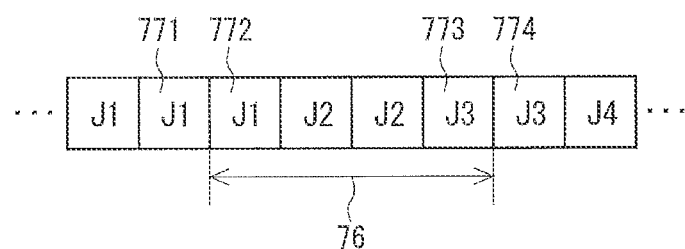
FIG. 7 is a diagram for explaining how to represent a progress state of a continuous printing process in the embodiment.

Further, in the following, a progress state of the continuous printing process will be expressed in the drawing, for example, as shown in FIG. 7. In FIG. 7, job names are written in rectangles. In this regard, for example, there are two jobs having a job name "J2". This means that the number of copies (the number of sets) of printing based on the job having the job name "J2" is two. In this case, printing based on the same job is repeated twice. Similarly to FIG. 6, jobs in the book-block completion waiting state are indicated in an arrow portion denoted by reference numeral 76. That is, FIG. 7 shows that four jobs from a job denoted by reference numeral 772 to a job denoted by reference numeral 773 are in the book-block completion waiting state. Further, the continuous printing process is sequentially performed from a job described on the left side to a job described on the right side. Therefore, a job denoted by reference numeral 771 is a job immediately after the book-block making process is completed, and a job denoted by reference numeral 774 is a job immediately before the corresponding paper portion is outputted from the web buffer 50.

5. EXAMPLES

Hereinafter, two examples (a first control example and a second control example) will be described regarding the self-control of the print speed. As described above, in the printing apparatus 10, the first speed that is the speed during the normal operation and the second speed that is the speed lower than the first speed are prepared as the settable print speeds. When the print speed is set to the first speed, the operation of the conveyance mechanism 210 is controlled so that the conveyance speed also becomes the first speed, and when the print speed is set to the second speed, the operation of the conveyance mechanism 210 is controlled so that the conveyance speed also becomes the second speed.

Hereinafter, the cumulative value of the increase and decrease amounts Z of the consumption amount of the web buffer 50 for jobs for which the book-block making process has been completed among jobs corresponding to print paper having passed through the web buffer 50 is referred to as a "first cumulative value", and the cumulative value of the increase and decrease amount Z of the consumption amount of the web buffer 50 for jobs for which the book-block making process has not been completed among jobs corresponding to print paper having passed through the web buffer 50 is referred to as a "second cumulative value". The first cumulative value is denoted by reference numeral n1, and the second cumulative value is denoted by reference numeral n2. The sum of the first cumulative value n1 and the second cumulative value n2 corresponds to the predicted value PV. A threshold to be compared with the sum of the first cumulative value n1 and the second cumulative value n2 (a threshold to be compared with the predicted value PV) is denoted by reference sign N.

5.1 First Control Example

Figure 8:
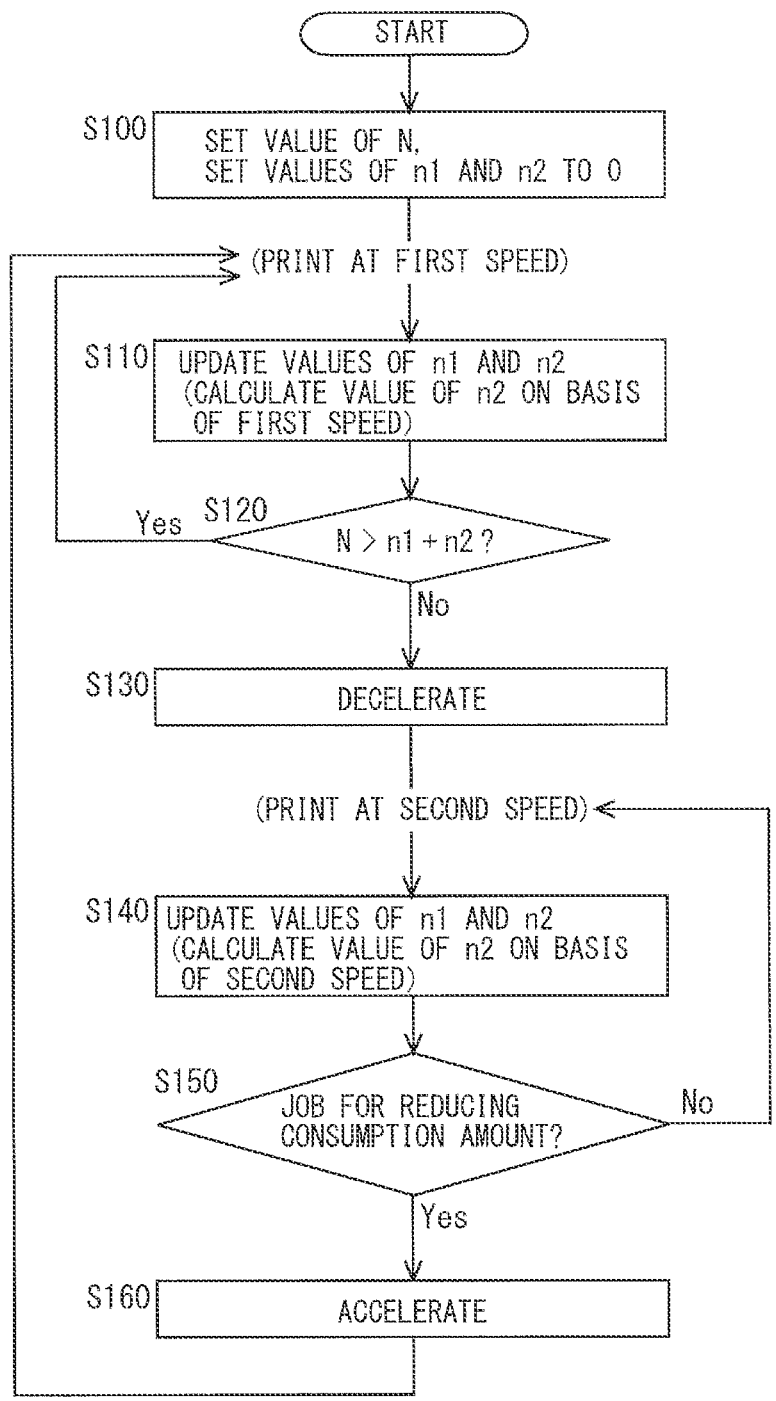
FIG. 8 is a flowchart showing a procedure for a first control example in the embodiment.

A procedure for the first control example will be described with reference to the flowchart shown in FIG. 8. It is assumed here that continuous printing based on a plurality of types of jobs having different sizes (that is, having different print lengths per set) is performed.

After the start of the continuous printing, printing is performed at the first speed. In other words, printing by the printing apparatus 10 is performed in a state where the print paper is being conveyed at the first speed. Then, after the book-block making process is performed on the head job of the continuous printing, the process of the flow shown in FIG. 8 is started.

First, the threshold N is set to an appropriate value, and the first cumulative value n1 and the second cumulative value n2 are set to 0 (step S100). The threshold N is set to, for example, a maximum capacity (maximum length) at which the web buffer 50 can hold print paper.

Thereafter, in a state where printing is being performed at the first speed, every time the book-block making process for one set in the gathering machine 63 is completed, the following are performed: the updating of the first cumulative value n1 and the second cumulative value n2 (step S110); and the comparison of the sum of the first cumulative value n1 and the second cumulative value n2 with the threshold N (step S120).

In step S110, the required print time calculation unit 152, the increase and decrease amount calculation unit 153, and the predicted value calculation unit 154 calculate the first cumulative value n1 and the second cumulative value n2. The first cumulative value n1 is obtained by the predicted value calculation unit 154 accumulating the increase and decrease amounts Z calculated by the increase and decrease amount calculation unit 153 for a job for which the book-block making process has been completed. The increase and decrease amount Z is calculated by the increase and decrease amount calculation unit 153 using the required print time PT calculated by the required print time calculation unit 152 on the basis of the conveyance speed when the book-block making process is performed. The second cumulative value n2 is obtained by the predicted value calculation unit 154 accumulating the increase and decrease amounts Z calculated by the increase and decrease amount calculation unit 153 for a job for which the book-block making process has not been completed among the jobs corresponding to the print paper having passed through the web buffer 50. The increase and decrease amount Z is calculated by the increase and decrease amount calculation unit 153 using the required print time PT calculated by the required print time calculation unit 152 on the basis of the first speed.

In step S120, the sum of the first cumulative value n1 and the second cumulative value n2 is compared with the threshold N. As a result, when the sum of the first cumulative value n1 and the second cumulative value n2 is less than the threshold N, the process returns to step S110 while printing is being performed at the first speed. On the other hand, when the sum of the first cumulative value n1 and the second cumulative value n2 is equal to or greater than the threshold N, the process proceeds to step S130. As described above, the sum of the first cumulative value n1 and the second cumulative value n2 corresponds to the predicted value PV of the consumption amount of the web buffer 50. That is, in step S120, it is determined whether or not the consumption amount of the web buffer 50 is equal to or greater than the threshold N in a case where the current conveyance speed (here, the first speed) is maintained.

In step S130, the conveyance control unit 143 controls the operation of the conveyance mechanism 210 so that the conveyance speed decelerates from the first speed to the second speed. Accordingly, printing is performed at the second speed. That is, printing by the printing apparatus 10 is performed in a state where the print paper is being conveyed at the second speed. Then, in a state where printing is being performed at the second speed, every time the book-block making process for one set in the gathering machine 63 is completed, the following are performed: the updating of the first cumulative value n1 and the second cumulative value n2 (step S140); and a determination as to whether or not a job to be subjected to the next book-block making process is a job for reducing the consumption amount of the web buffer 50 even when the conveyance speed (print speed) is returned to the first speed (step S150).

In step S140, the first cumulative value n1 and the second cumulative value n2 are calculated in the same manner as in step S110. However, the increase and decrease amount Z, which is the basis of the calculation of the second cumulative value n2, is calculated by the increase and decrease amount calculation unit 153 using the required print time PT calculated by the required print time calculation unit 152 on the basis of the second speed.

In step S150, it is determined whether or not the job to be subjected to the next book-block making process is the job for reducing the consumption amount of the web buffer 50 by comparing the required print time PT calculated by the required print time calculation unit 152 on the basis of the first speed with the minimum processing time MT set by the minimum processing time setting unit 151. When the required print time PT is longer than the minimum processing time MT, it is determined that the job is a job for reducing the consumption amount of the web buffer 50, and the process proceeds to step S160. On the other hand, when the required print time PT is equal to or shorter than the minimum processing time MT, it is determined that the job is not a job for reducing the consumption amount of the web buffer 50, and the process returns to step S140 while printing is being performed at the second speed.

In step S160, the conveyance control unit 143 controls the operation of the conveyance mechanism 210 so that the conveyance speed accelerates from the second speed to the first speed. As a result, printing is performed at the first speed, and the process returns to step S110.

As described above, according to the first control example, the conveyance speed decelerates from the first speed to the second speed when it is predicted that the consumption amount of the web buffer 50 will become equal to or greater than the threshold N if the first speed is maintained, and thereafter, the conveyance speed accelerates from the second speed to the first speed when the process of the job for reducing the consumption amount of the web buffer 50 even if the conveyance speed accelerates to the first speed is performed by the gathering machine 63.

Next, a specific example of the first control example will be described. Here, attention is focused on a case where continuous printing based on four types of jobs (job Ja, job Jb, job Jc, and job Jd) shown in FIG. 9 is performed. A speed corresponding to the first speed is 120 mpm, and a speed corresponding to the second speed is 90 mpm. Regarding the control of the conveyance speed, although a certain time is actually required for deceleration and acceleration, it is assumed here that deceleration and acceleration are performed instantaneously for convenience of description (the same applies to a specific example of the second control example). It is assumed that the threshold N has been set to 20. It is assumed that the distance of the paper portion in the book-block completion waiting state (i.e., the distance of the portion denoted by reference numeral 76 in FIG. 6) is 24 m. Note that the unit of the increase and decrease amount is omitted.

After the start of continuous printing, printing based on the job Ja is performed in a state where the print speed is set to 120 mpm (i.e., in a state where the conveyance speed is set to 120 mpm.). For the job Ja, the increase and decrease amount of the consumption amount of the web buffer 50 per set at a print speed of 120 mpm is 0. Thus, the print speed (conveyance speed) is maintained at 120 mpm during a period in which the book-block making process for the job Ja is performed by the gathering machine 63.

Figure 10:
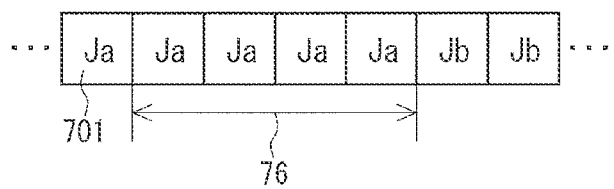
FIG. 10 is a diagram for explaining a specific example of the first control example in the embodiment.

When the process progress state becomes a state schematically shown in FIG. 10, that is, when the book-block making process is completed for the job Ja of a ninety sixth set (a job denoted by reference numeral 701), the first cumulative value n1 is 0, and the second cumulative value n2 is also 0.

Figure 11:
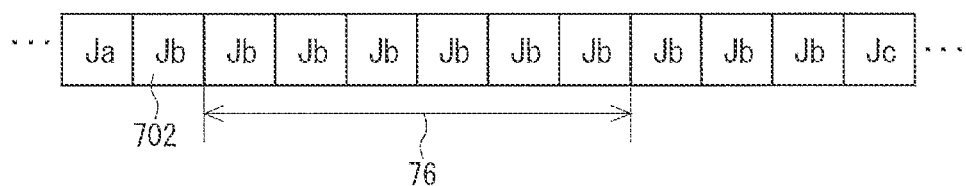
FIG. 11 is a diagram for explaining a specific example of the first control example in the embodiment.

Thereafter, when the process progress state becomes a state schematically shown in FIG. 11, the book-block making process has been completed for the job Jb of a first set (a job denoted by reference numeral 702). For the job Jb, the increase and decrease amount of the consumption amount of the web buffer 50 per set at a print speed of 120 mpm is 2. Thus, at this time, the first cumulative value n1 is 2. Further, at this time, since the jobs Jb for six sets are in the book-block completion waiting state, the second cumulative value n2 is 12. Since the sum of the first cumulative value n1 and the second cumulative value n2 is 14, the print speed (conveyance speed) is maintained at 120 mpm.

Figure 12:
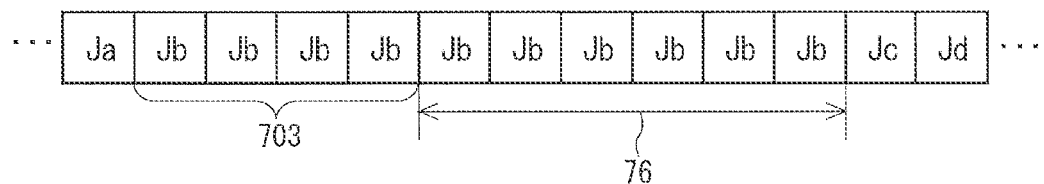
FIG. 12 is a diagram for explaining a specific example of the first control example in the embodiment.

Thereafter, when the process progress state becomes the state schematically shown in FIG. 12, the book-block making process has been completed for the jobs Jb of the first to fourth sets (jobs denoted by reference numeral 703). Thus, at this time, the first cumulative value n1 is 8. Further, at this time, since the jobs Jb for six sets are in the book-block completion waiting state, the second cumulative value n2 is 12. From the above, the sum of the first cumulative value n1 and the second cumulative value n2 is 20. With the threshold N being 20, "N>n1+n2" does not hold. Thus, the print speed (conveyance speed) decelerates from 120 mpm to 90 mpm.

Thereafter, every time the book-block making process for one set in the gathering machine 63 is completed, it is determined whether or not the job to be subjected to the next book-block making process is the job for reducing the consumption amount of the web buffer 50 even when the print speed (conveyance speed) is increased to 120 mpm. Then, when the next process target in the gathering machine 63 becomes the job Jd (see FIG. 9), the print speed (conveyance speed) accelerates from 90 mpm to 120 mpm.

Figure 13:
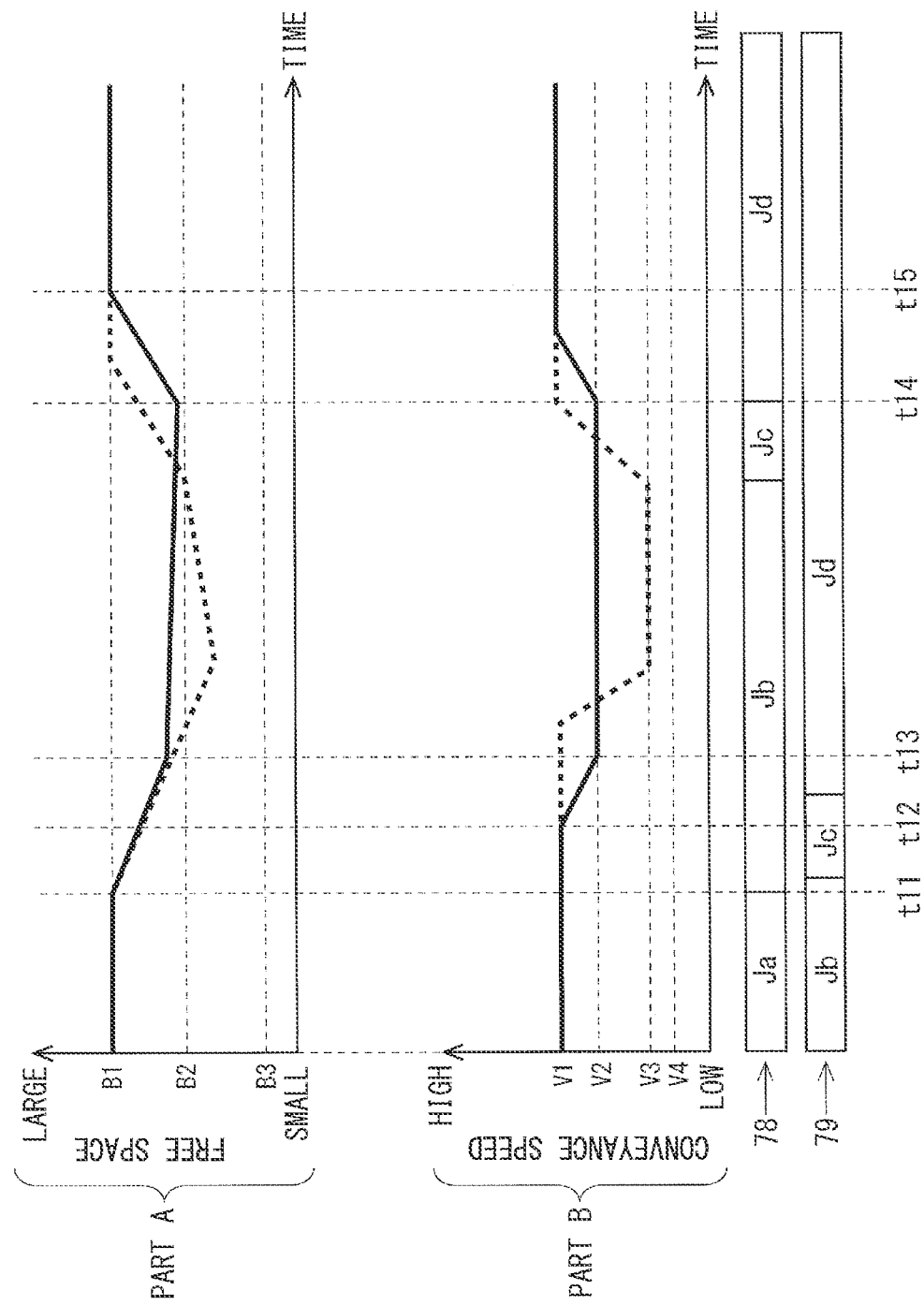
FIG. 13 is a diagram for explaining an operation example in the embodiment.

FIG. 13 shows an example of a change in the free space of the web buffer 50 (see Part A) and a change in the conveyance speed (see Part B) in the above-described specific example. For each of Part A and Part B, a change in the present embodiment is represented by a thick solid line, and a change according to the conventional example is represented by a thick dotted line. For Part A, B1 represents the free space in a steady state, B2 represents the free space at which the web buffer 50 requests the printing apparatus 10 to decelerate, and B3 represents the free space at which the web buffer 50 requests the printing apparatus 10 to stop. For Part B, V1 represents the first speed (120 mpm), V2 represents the second speed (90 mpm), V3 represents the lowest printable conveyance speed, and V4 represents the conveyance speed when printing is stopped. Note that a column indicated by an arrow of reference numeral 78 represents a job transition during the execution of the book-block making process, and a column indicated by an arrow of reference numeral 79 represents a job transition during the execution of printing by the printing apparatus 10.

In a state where printing is being performed while the print speed (conveyance speed) is maintained at 120 mpm, at time t11, the book-block making process for the job Jb is started. Since the print time per set at a print speed of 120 mpm is shorter than the above-described minimum processing time MT for the job Jb, the free space of the web buffer 50 gradually decreases after time point t11. At time point t12, the predicted value PV of the consumption amount of the web buffer 50 (the sum of the first cumulative value n1 and the second cumulative value n2) becomes equal to or greater than the threshold N, and the deceleration of the conveyance speed is started. The deceleration of the conveyance speed is completed at time t13, and the decrease in the free space of the web buffer 50 becomes gentle. Thereafter, at time t14, the book-block making process for the job Jd is started. For the job Jd, the print time per set at a print speed of 120 mpm is longer than the above-described minimum processing time MT. That is, the job Jd is a job for increasing the free space of the web buffer 50 (a job for reducing the consumption amount of the web buffer 50) even when the conveyance speed is returned to 120 mpm. Thus, at time t14, the acceleration of the conveyance speed is started. Then, at time t15, the free space of the web buffer 50 becomes the free space in the steady state.

Here, focusing on Part B in FIG. 13, it can be grasped that the variation in the conveyance speed is smaller in the present embodiment (see thick solid line) than in the conventional example (see thick dotted line). As described above, when the variation in the conveyance speed is large, the print quality decreases due to various factors. In this regard, according to the present embodiment, since the variation in the conveyance speed is smaller than that in the conventional example, a decrease in print quality due to the control of the conveyance speed is prevented.

5.2 Second Control Example

Figure 14:
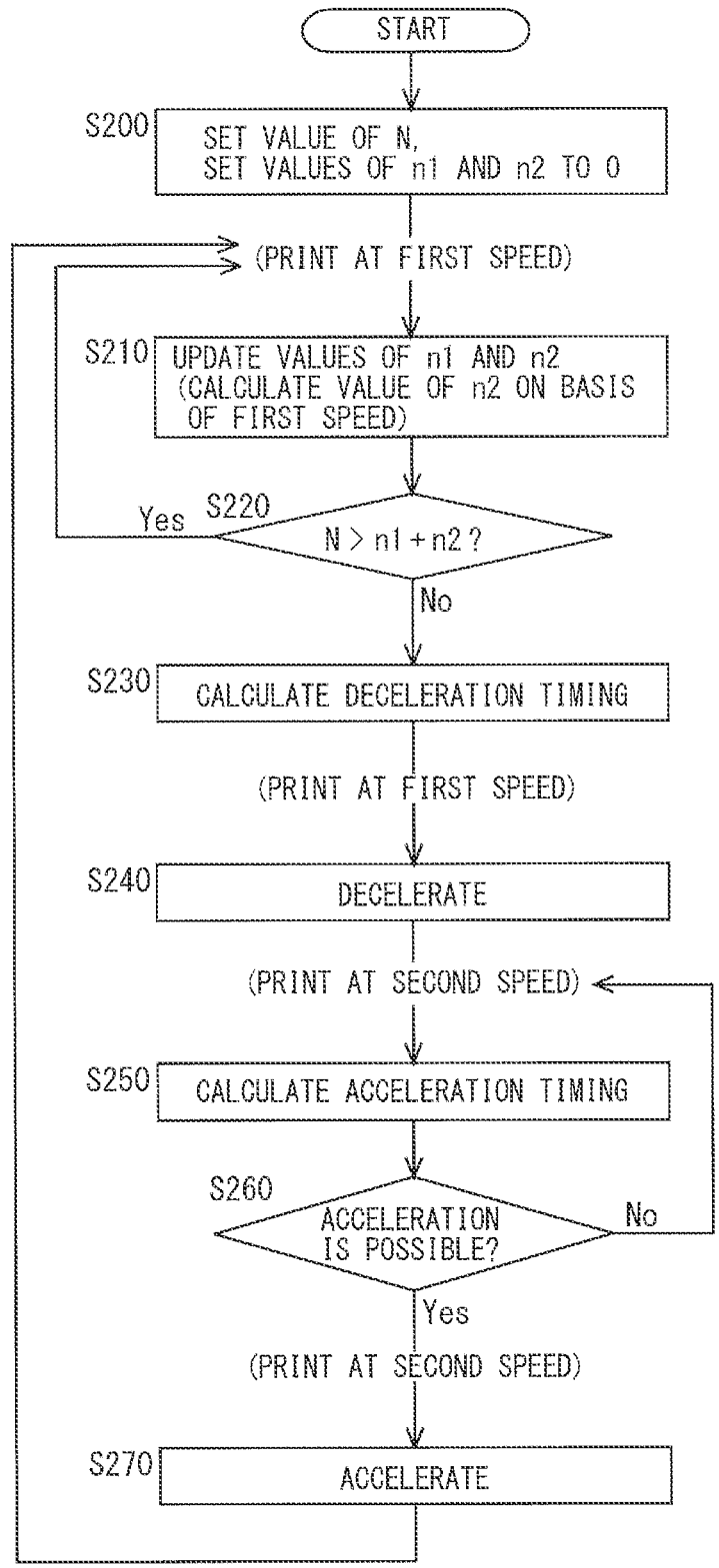
FIG. 14 is a flowchart showing a procedure for a second control example in the embodiment.

A procedure for the second control example will be described with reference to the flowchart shown in FIG. 14.

Also here, a description will be given assuming that continuous printing based on a plurality of types of jobs having different sizes (that is, having different print lengths per set) is performed.

In steps S200 to S220, processes similar to those in steps S100 to S120 (see FIG. 8) in the first control example are performed. When the sum of the first cumulative value n1 and the second cumulative value n2 is equal to or greater than the threshold N in step S220, the process proceeds to step S230.

Figure 15:
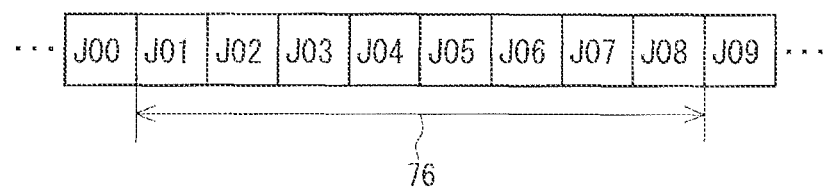
FIG. 15 is a diagram for explaining calculation of a deceleration timing in the second control example in the embodiment.

In step S230, a deceleration timing is calculated. This will be described with reference to FIG. 15. It is assumed that the process progress state has become a state schematically shown in FIG. 15 at the time when the deceleration timing is calculated. In FIG. 15, a reference numeral for identifying a set of a job to be processed is written in a rectangle. The state shown in FIG. 15 is a state immediately after the book-block making process for the job J00 is completed. Jobs for eight sets (jobs J01 to J08) are in the book-block completion waiting state.

First, the first cumulative value n1 and the second cumulative value n2 are calculated assuming that the book-block making process up to the job J08 is performed in a state where the conveyance speed is maintained at the first speed (e.g., 120 mpm), and that the conveyance speed is decreased from the first speed to the second speed (e.g., 90 mpm) at the start of the book-block making process for the job J09. Next, the first cumulative value n1 and the second cumulative value n2 are calculated assuming that the book-block making process up to the job J07 is performed in a state where the conveyance speed is maintained at the first speed, and that the conveyance speed is decreased from the first speed to the second speed at the start of the book-block making process for the job J08. Next, the first cumulative value n1 and the second cumulative value n2 are calculated assuming that the book-block making process up to the job J06 is performed in a state where the conveyance speed is maintained at the first speed, and that the conveyance speed is decreased from the first speed to the second speed at the start of the book-block making process for the job J07. As described above, the first cumulative value n1 and the second cumulative value n2 are calculated for each provisional timing while the provisional timing for decreasing the conveyance speed is gradually advanced. Then, the timing at which the sum of the first cumulative value n1 and the second cumulative value n2 first falls below the threshold N is determined as the deceleration timing.

After the calculation of the deceleration timing is completed, printing by the printing apparatus 10 is performed in a state where the print paper is being conveyed at the first speed. Then, at the deceleration timing determined in step S230, the conveyance control unit 143 controls the operation of the conveyance mechanism 210 so that the conveyance speed decelerates from the first speed to the second speed (step S240). Accordingly, printing is performed at the second speed. That is, printing by the printing apparatus 10 is performed in a state where the print paper is being conveyed at the second speed.

Figure 16:
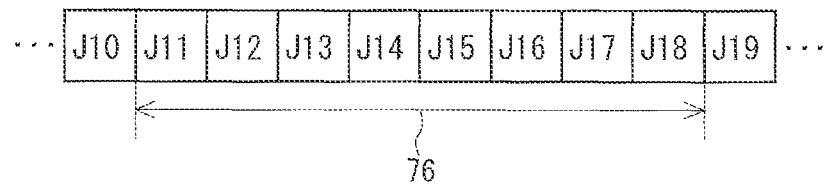
FIG. 16 is a diagram for explaining calculation of an acceleration timing in the second control example in the embodiment.

In step S250, an acceleration timing is calculated. This will be described with reference to FIG. 16. It is assumed that the process progress state has become a state schematically shown in FIG. 16 at the time when the acceleration timing is calculated. Similarly to FIG. 15, a reference numeral for identifying a set of a job to be processed is written in a rectangle. The state shown in FIG. 16 is a state immediately after the book-block making process for the job J10 is completed. Jobs for eight sets (jobs J11 to J18) are in the book-block completion waiting state.

First, the first cumulative value n1 and the second cumulative value n2 are calculated assuming that the conveyance speed is increased from the second speed to the first speed (e.g., 120 mpm) at the start of the book-block making process for the job J11. Next, the first cumulative value n1 and the second cumulative value n2 are calculated assuming that the conveyance speed is increased from the second speed to the first speed at the start of the book-block making process for the job J12. Next, the first cumulative value n1 and the second cumulative value n2 are calculated assuming that the conveyance speed is increased from the second speed to the first speed at the start of the book-block making process for the job J13. As described above, the first cumulative value n1 and the second cumulative value n2 are calculated for each provisional timing while gradually delaying the provisional timing of increasing the conveyance speed. Then, the timing at which the sum of the first cumulative value n1 and the second cumulative value n2 first falls below the threshold N is determined as the acceleration timing. However, there may be no timing at which the sum of the first cumulative value n1 and the second cumulative value n2 falls below the threshold N.

After the acceleration timing is calculated, it is determined whether acceleration is possible (step S260). Specifically, it is determined whether or not there is a timing at which the sum of the first cumulative value n1 and the second cumulative value n2 falls below the threshold N in the immediately preceding step 3250. Then, when there is a timing at which the sum of the first cumulative value n1 and the second cumulative value n2 falls below the threshold N, it is determined that acceleration is possible, and the process proceeds to step S270. On the other hand, when there is no timing at which the sum of the first cumulative value n1 and the second cumulative value n2 falls below the threshold N, the process returns to step S250 while printing is being performed at the second speed. The processes in steps S250 and S260 are performed every time the book-block making process for one set in the gathering machine 63 is completed until the timing at which acceleration can be performed (the timing at which the sum of the first cumulative value n1 and the second cumulative value n2 falls below the threshold N) is obtained.

When it is determined in step S260 that acceleration is possible, printing by the printing apparatus 10 is performed in a state where the print paper is being conveyed at the second speed until the acceleration timing determined in step S250. Then, at the acceleration timing determined in step S250, the conveyance control unit 143 controls the operation of the conveyance mechanism 210 so that the conveyance speed accelerates from the second speed to the first speed (step S270). As a result, printing is performed at the first speed, and the process returns to step S210.

As can be grasped from the process of steps S220 to S240, according to the second control example, when the predicted value PV (the sum of the first cumulative value n1 and the second cumulative value n2) in a case where the conveyance speed is maintained at the first speed becomes equal to or greater than the predetermined threshold N, the conveyance control unit 143 decreases the conveyance speed from the first speed to the second speed at the latest timing of one or more conveyance speed decrease timings at which the predicted value PV (the sum of the first cumulative value n1 and the second cumulative value n2) in a case where the conveyance speed is decreased from the first speed to the second speed does not become equal to or greater than the threshold N.

Further, as can be grasped from the process of steps S250 to S270, according to the second control example, after the conveyance control unit decreases the conveyance speed from the first speed to the second speed on the basis of the predicted value PV (the sum of the first cumulative value n1 and the second cumulative value n2), the conveyance control unit 143 increases the conveyance speed from the second speed to the first speed at the earliest timing of the conveyance speed increase timings at which the predicted value PV (the sum of the first cumulative value n1 and the second cumulative value n2) in a case where the conveyance speed is increased from the second speed to the first speed does not become equal to or greater than the threshold N.

Next, a specific example of the second control example will be described. Here, attention is focused on a case where continuous printing based on five types of jobs (job Ja, job Jb, job Jc, job Jd, and job Je) shown in FIG. 17 is performed. A speed corresponding to the first speed is 120 mpm, and a speed corresponding to the second speed is 90 mpm. It is assumed that the distance of the paper portion in the book-block completion waiting state (i.e., the distance of the portion denoted by reference numeral 76 in FIG. 6) is 22 m.

After the start of the continuous printing, printing based on the job Ja, printing based on the job Jb, and printing based on the job Jc are sequentially performed in a state where the print speed is set to 120 mpm (i.e., in a state where the conveyance speed is set to 120 mpm.).

For the job Ja, the increase and decrease amount of the consumption amount of the web buffer 50 per set at a print speed of 120 mpm is 2. For the job Jb, the increase and decrease amount of the consumption amount of the web buffer 50 per set at a print speed of 120 mpm is 0. For the job Jc, the increase and decrease amount of the consumption amount of the web buffer 50 per set at a print speed of 120 mpm is 5. From the above, until the job Jc of a fourth set comes into the book-block completion waiting state, the sum of the first cumulative value n1 and the second cumulative value n2 is maintained to be less than the threshold N.

Figure 18:
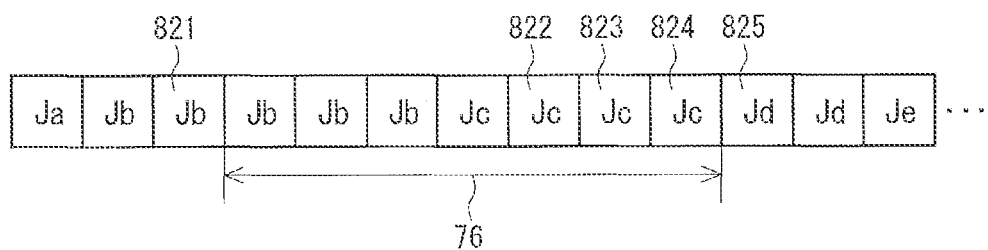
FIG. 18 is a diagram for explaining a specific example of the second control example in the embodiment.

When the process progress state becomes a state schematically shown in FIG. 18, the process by the gathering machine 63 is completed for the job Jb of a second set (a job denoted by reference numeral 821). At this time, the first cumulative value n1 is 2. Further, at this time, since the jobs Jb for three sets and the jobs Jc for four sets are in the book-block completion waiting state, the second cumulative value n2 is 20. Thus, the sum of the first cumulative value n1 and the second cumulative value n2 is equal to or greater than the threshold N. Therefore, the deceleration timing is calculated (step S230 in FIG. 14).

When it is assumed that the book-block making process up to the job Jc of a fourth set (a job denoted by reference numeral 824) is performed in a state where the conveyance speed is maintained at 120 mpm, and that the conveyance speed is decreased from 120 mpm to 90 mpm at the start of the book-block making process for the job Jd of a first set (a job denoted by reference numeral 825), the first cumulative value n1 is 2, and the second cumulative value n2 is 20. Since the sum of the first cumulative value n1 and the second cumulative value n2 is equal to or greater than the threshold N, the start timing of the book-block making process for the job Jd of the first set (the job denoted by reference numeral 825) cannot be employed as the deceleration timing.

For the job Jc, the increase and decrease amount of the consumption amount of the web buffer 50 per set at a print speed of 90 mpm is 3.5. Therefore, when it is assumed that the book-block making process up to the job Jc of a third set (a job denoted by reference numeral 823) is performed in a state where the conveyance speed is maintained at 120 mpm, and that the conveyance speed is decreased from 120 mpm to 90 mpm at the start of the book-block making process for the job Jc of the fourth set (the job denoted by reference numeral 824), the first cumulative value n1 is 2, and the second cumulative value n2 is 18.5. Since the sum of the first cumulative value n1 and the second cumulative value n2 is equal to or greater than the threshold N, the start timing of the book-block making process for the job Jc of the fourth set (the job denoted by reference numeral 824) cannot be employed as the deceleration timing.

When it is assumed that the book-block making process up to the job Jc of a second set (a job denoted by reference numeral 822) is performed in a state where the conveyance speed is maintained at 120 mpm, and that the conveyance speed is decreased from 120 mpm to 90 mpm at the start of the book-block making process for the job Jc of the third set (the job denoted by reference numeral 823), the first cumulative value n1 is 2, and the second cumulative value n2 is 17. The sum of the first cumulative value n1 and the second cumulative value n2 is less than the threshold N. From the above, the start timing of the book-block making process for the job Jc of the third set (the job denoted by reference numeral 823) is determined as the deceleration timing.

Figure 19:
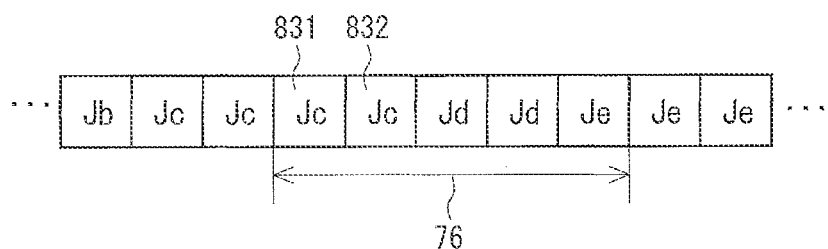
FIG. 19 is a diagram for explaining a specific example of the second control example in the embodiment.
Figure 20:
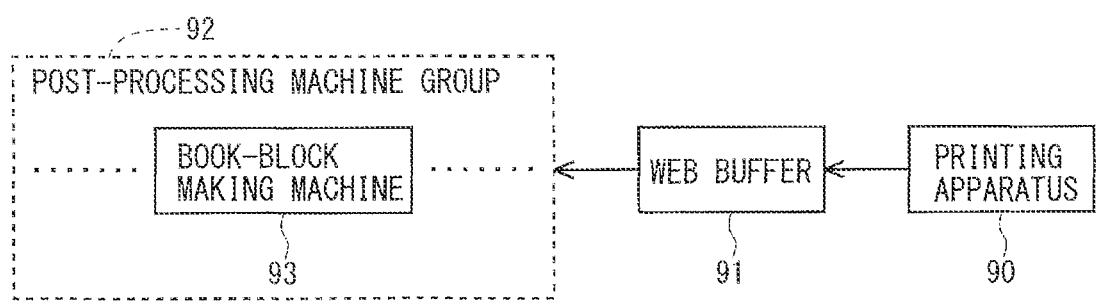
FIG. 20 is a diagram for explaining that a web buffer for temporarily holding printed print paper is provided regarding a conventional example.
Figure 21:
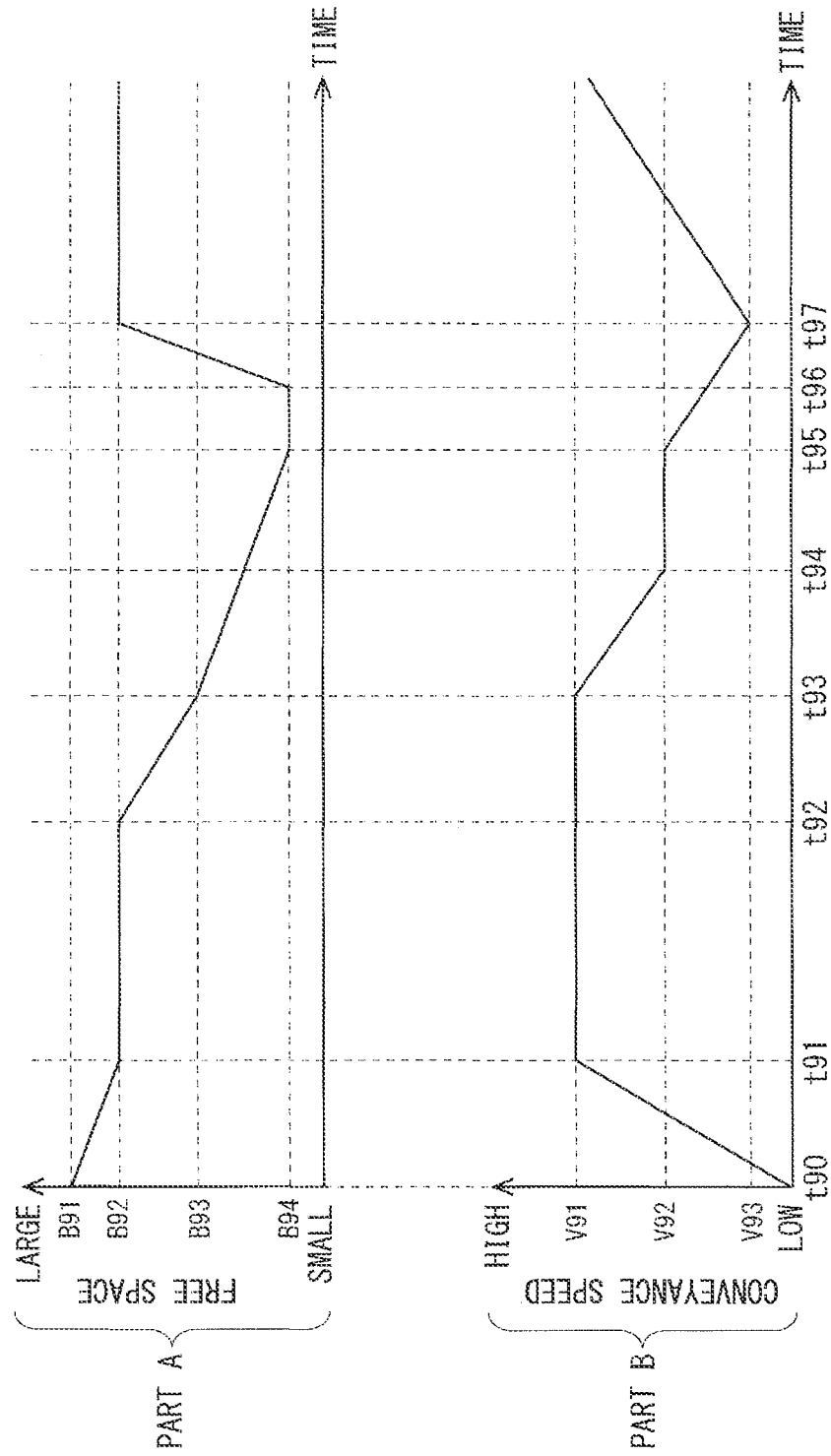
FIG. 21 is a diagram for explaining a conventional operation example.

At the deceleration timing, the process progress state becomes a state schematically shown in FIG. 19. By this timing, the book-block making process for the jobs Ja for one set, the jobs Jb for five sets, and the jobs Jc for two sets has been performed in a state where the conveyance speed is maintained at 120 mpm. Therefore, at this time, the first cumulative value n1 is 12. Under such a state, the calculation of the acceleration timing (step S250 in FIG. 14) is performed. For the job Jd, the increase and decrease amount of the consumption amount of the web buffer 50 per set at the print speed of 120 mpm is 1. For the job Je, the increase and decrease amount of the consumption amount of the web buffer 50 per set at the print speed of 120 mpm is −4.

When it is assumed that the conveyance speed is increased from 90 mpm to 120 mpm at the start of the book-block making process for the job Jc of a third set (a job denoted by reference numeral 831), the first cumulative value n1 is 12, and the second cumulative value n2 is 8. Since the sum of the first cumulative value n1 and the second cumulative value n2 is not less than the threshold N, the start timing of the book-block making process for the job Jc of the third set (the job denoted by reference numeral 831) cannot be employed as the acceleration timing.

When it is assumed that the conveyance speed is increased from 90 mpm to 120 mpm at the start of the book-block making process for the job Jc of a fourth set (a job denoted by reference numeral 832), the first cumulative value n1 is 12, and the second cumulative value n2 is 6.5. The sum of the first cumulative value n1 and the second cumulative value n2 is less than the threshold N. From the above, the start timing of the book-block making process for the job Jc of the fourth set (the job denoted by reference numeral 832) is determined as the acceleration timing.

6. EFFECTS

According to the present embodiment, for each job, the increase and decrease amount Z of the consumption amount of the web buffer 50 per set is calculated on the basis of the difference between the required print time PT, which is the time per set required to perform printing, and the minimum processing time MT, which is the least required time for a process for one set in the post-processing machine. Then, the predicted value PV of the consumption amount of the web buffer 50 is obtained by accumulating the increase and decrease amounts Z, and the conveyance speed at which the print paper is conveyed is controlled on the basis of the predicted value PV. For example, when the predicted value PV becomes equal to or greater than the threshold N set in consideration of the maximum capacity of the web buffer 50, the conveyance speed decelerates, and when a decrease in the consumption amount of the web buffer 50 is predicted, the conveyance speed accelerates. As above, the printing apparatus 10 can voluntarily control the conveyance speed in consideration of the change in the consumption amount of the web buffer 50, without a request (a request for deceleration or stop) from the post-processing machine or the web buffer 50. It is thereby possible to make the variation in the conveyance speed smaller than in the past. Further, by controlling the conveyance speed on the basis of the predicted value PV, the conveyance speed can be reduced at a timing earlier than in the past, and as a result, the possibility of stopping printing is reduced. From the above, a decrease in print quality and a decrease in productivity are prevented. Even when there is a request for deceleration or stop from the post-processing machine or the web buffer 50 to the printing apparatus 10, in a case where it is expected that the free space of the web buffer 50 will not be in the exhaustion state, printing can be continued in a state where the current conveyance speed (print speed) is maintained without deceleration. As a result, productivity is improved more than in the related art. Moreover, since the conveyance speed can be controlled so that the consumption amount of the web buffer 50 is as small as possible, it is possible to employ the web buffer 50 having a smaller maximum capacity than in the past. Thereby, an effect of cost reduction can be obtained. As described above, according to the present embodiment, the printing system 1 capable of preventing a decrease in print quality and a decrease in productivity due to control of a conveyance speed (a speed at which print paper is conveyed) for reducing the difference in process speed between the printing apparatus 10 and the post-processing machine is achieved.

7. OTHERS

The present invention is not limited to the above embodiment, and various modifications can be made without departing from the gist of the present invention. For example, although the least required time from a start time of a process for one set to a start time of a process for the next one set in the gathering machine 63 is set as the minimum processing time MT in the above embodiment, the present invention is not limited thereto. The least required time from a start time of a process for one set to a start time of a process for the next one set in any post-processing machine that causes a temporal bottleneck in the post-processing step may be set as the minimum processing time MT. Further, although the example in which the conveyance speed is changed between two stages of speeds has been described in the above embodiment, a configuration in which the conveyance speed is changed between three or more stages of speeds can also be employed.

This application is an application claiming priority based on Japanese Patent Application No. 2021-046821 entitled "PRINTING SYSTEM AND PRINTING METHOD" filed on Mar. 22, 2021, and the contents of which are herein incorporated by reference.

What is claimed is:

1. A printing system including a printing apparatus configured to send a print medium after printing to a post-processing machine group including one or more post-processing machines, the printing apparatus being capable of performing continuous printing based on a plurality of jobs, the printing system comprising:
   a conveyance mechanism configured to convey the print medium and provided inside the printing apparatus;
   a print medium buffer for temporarily holding a print medium after printing when printing based on a job for which a required print time is shorter than a minimum processing time is performed, the print medium buffer being provided between the printing apparatus and the post-processing machine group, the required print time being a time per set required for printing by the printing apparatus, the minimum processing time being a least required time from a start time of a process for one set to a start time of a process for a next one set in the post-processing machine group;
   a required print time calculation unit configured to calculate the required print time for each of the jobs;
   an increase and decrease amount calculation unit configured to calculate, for each of the jobs, an increase and decrease amount of a consumption amount of the print medium buffer per set on a basis of a difference between the minimum processing time and the required print time;
   a predicted value calculation unit configured to obtain a predicted value of the consumption amount of the print medium buffer by accumulating increase and decrease amounts calculated by the increase and decrease amount calculation unit; and
   a conveyance control unit configured to control a conveyance speed at which the conveyance mechanism conveys the print medium on a basis of the predicted value.

2. The printing system according to claim 1, wherein the predicted value calculation unit obtains the predicted value by accumulating the increase and decrease amounts calculated by the increase and decrease amount calculation unit for a job corresponding to a print medium that passes through the print medium buffer.

3. The printing system according to claim 1, wherein the conveyance control unit decreases the conveyance speed when the predicted value becomes equal to or greater than a predetermined threshold.

4. The printing system according to claim 3, wherein the threshold is set to be a maximum capacity at which the print medium buffer is able to hold the print medium.

5. The printing system according to claim 1, wherein the post-processing machine group includes
   a cutting machine configured to cut a print medium after printing by the printing apparatus, and
   a book-block making machine configured to make a book block by collecting print media after cutting by the cutting machine for each one set, and
   the minimum processing time is a least required time from a start time of a process for one set to a start time of a process for a next one set in the book-block making machine.

6. The printing system according to claim 5, wherein the book-block making machine is a gathering machine.

7. The printing system according to claim 5, wherein the predicted value calculation unit obtains the predicted value each time the book-block making machine performs a process for one set.

8. The printing system according to claim 5, wherein the predicted value calculation unit obtains the predicted value by accumulating increase and decrease amounts calculated, for a job for which a process by the book-block making machine is completed among jobs corresponding to a print medium that passes through the print medium buffer, by the increase and decrease amount calculation unit using a required print time calculated by the required print time calculation unit on a basis of a conveyance speed when the process by the book-block making machine is performed, and increase and decrease amounts calculated, for a job for which a process by the book-block making machine is not completed among jobs corresponding to a print medium that passes through the print medium buffer, by the increase and decrease amount calculation unit using a required print time calculated by the required print time calculation unit on a basis of a current conveyance speed.

9. The printing system according to claim 5, wherein when the conveyance speed is changed by the conveyance control unit, the predicted value calculation unit obtains the predicted value by accumulating increase and decrease amounts calculated, for a job for which a process by the book-block making machine is completed among jobs corresponding to a print medium that passes through the print medium buffer, by the increase and decrease amount calculation unit using a required print time calculated by the required print time calculation unit on a basis of a conveyance speed when a process by the book-block making machine is performed, and increase and decrease amounts calculated, for a job for which a process by the book-block making machine is not completed among jobs corresponding to a print medium that passes through the print medium buffer, by the increase and decrease amount calculation unit using a required print time calculated by the required print time calculation unit on a basis of a changed conveyance speed.

10. The printing system according to claim 5, wherein
a first speed and a second speed lower than the first speed are prepared as the conveyance speed for the printing apparatus, and
after the conveyance control unit decreases the conveyance speed from the first speed to the second speed on a basis of the predicted value, the conveyance control unit increases the conveyance speed from the second speed to the first speed when a print medium after printing based on a job for reducing the consumption amount of the print medium buffer even in a case where the conveyance speed is the first speed is processed by the book-block making machine.

11. The printing system according to claim 5, wherein
a first speed and a second speed lower than the first speed are prepared as the conveyance speed for the printing apparatus, and
when the predicted value in a case where the conveyance speed is maintained at the first speed becomes equal to or greater than a predetermined threshold, the conveyance control unit decreases the conveyance speed from the first speed to the second speed at a latest timing of one or more conveyance speed decrease timings at which the predicted value in a case where the conveyance speed is decreased from the first speed to the second speed does not become equal to or greater than the threshold.

12. The printing system according to claim 11, wherein after the conveyance control unit decreases the conveyance speed from the first speed to the second speed on a basis of the predicted value, the conveyance control unit increases the conveyance speed from the second speed to the first speed at an earliest timing of conveyance speed increase timings at which the predicted value when the conveyance speed is increased from the second speed to the first speed does not become equal to or greater than the threshold.

13. The printing system according to claim 1, wherein even when there is an instruction to stop the conveyance mechanism or decrease the conveyance speed from the print medium buffer or the post-processing machine group to the printing apparatus, the conveyance control unit maintains the current conveyance speed unless the predicted value in a case where the current conveyance speed is maintained is equal to or greater than a predetermined threshold.

14. A printing method in a printing system including a printing apparatus configured to send a print medium after printing to a post-processing machine group including one or more post-processing machines, the printing being capable of performing continuous printing based on a plurality of jobs,
the printing system including
a conveyance mechanism configured to convey the print medium and provided inside the printing apparatus, and
a print medium buffer for temporarily holding a print medium after printing when printing based on a job for which a required print time is shorter than a minimum processing time is performed, the print medium buffer being provided between the printing apparatus and the post-processing machine group, the required print time being a time per set required for printing by the printing apparatus, the minimum processing time being a least required time from a start time of a process for one set to a start time of a process for a next one set in the post-processing machine group,
the printing method comprising:
a required print time calculation step of calculating the required print time for each of the jobs;
an increase and decrease amount calculation step of calculating, for each of the jobs, an increase and decrease amount of a consumption amount of the print medium buffer per set on a basis of a difference between the minimum processing time and the required print time;
a predicted value calculation step of obtaining a predicted value of the consumption amount of the print medium buffer by accumulating increase and decrease amounts calculated by the increase and decrease amount calculation step; and
a conveyance control step of controlling a conveyance speed at which the conveyance mechanism conveys the print medium on a basis of the predicted value.

* * * * *